(12) United States Patent
Roddy et al.

(10) Patent No.: US 7,552,471 B2
(45) Date of Patent: Jun. 23, 2009

(54) PROVIDING SECURITY FOR EXTERNAL ACCESS TO A PROTECTED COMPUTER NETWORK

(75) Inventors: Brian J. Roddy, San Francisco, CA (US); Michael Hanson, Menlo Park, CA (US); John O. Lilly, III, Sunnyvale, CA (US)

(73) Assignee: Reactivity, Inc., San Jose, CA (US)

( * ) Notice: Subject to any disclaimer, the term of this patent is extended or adjusted under 35 U.S.C. 154(b) by 525 days.

(21) Appl. No.: 11/370,259

(22) Filed: Mar. 6, 2006

(65) Prior Publication Data

US 2006/0253901 A1 Nov. 9, 2006

Related U.S. Application Data

(63) Continuation of application No. 10/976,087, filed on Oct. 26, 2004, now Pat. No. 7,043,753, and a continuation of application No. 10/099,469, filed on Mar. 12, 2002, now Pat. No. 6,845,452.

(51) Int. Cl.
*G06F 21/00* (2006.01)
*G06F 15/16* (2006.01)

(52) U.S. Cl. .............................. 726/11; 709/223; 726/1
(58) Field of Classification Search .................... None
See application file for complete search history.

(56) References Cited

U.S. PATENT DOCUMENTS

| 6,182,226 | B1 * | 1/2001 | Reid et al. ................... 726/15 |
| 7,043,753 | B2 * | 5/2006 | Roddy et al. .................. 726/11 |
| 7,360,237 | B2 * | 4/2008 | Engle et al. ..................... 726/1 |
| 7,428,746 | B2 * | 9/2008 | Engle et al. ..................... 726/1 |
| 7,428,753 | B2 * | 9/2008 | Engle et al. ................... 726/12 |

* cited by examiner

*Primary Examiner*—Christopher A Revak
(74) *Attorney, Agent, or Firm*—Baker Botts L.L.P.

(57) ABSTRACT

A system and method are disclosed for providing controlled access via an external network to a resource residing on an internal network. An external request addressed to a first computer system associated with the internal network is received at the first computer system via the external network. The external request comprises a request from a requesting party for response data from a second computer system associated with the internal network. At least part of the content of the external request is analyzed at the first computer system to determine whether the request is authorized. If it is determined that the request is authorized, the request is processed.

19 Claims, 15 Drawing Sheets

PROVIDING SECURITY FOR EXTERNAL ACCESS TO A PROTECTED COMPUTER NETWORK

CROSS REFERENCE TO OTHER APPLICATIONS

This is a Continuation of application Ser. No. 10/976,087, filed Oct. 26, 2004 now U.S. Pat. No. 7,043,753, and application Ser. No. 10/099,469, filed Mar. 12, 2002, and now U.S. Pat. No. 6,845,452, which is hereby incorporated by reference.

FIELD OF THE INVENTION

The present invention relates generally to computer security and, more particularly, to a system and method for providing controlled external access to a protected internal network.

BACKGROUND OF THE INVENTION

Increasingly, users of corporate and other computer networks have desired to provide limited and controlled access via a public or other external network, such as the Internet, to portions of their internal computer network. For example, a company engaged in the manufacture and sale of some article of commerce may wish to provide its customers, or certain select customers, with limited access to the company's order management system. The company may wish to limit such customers, for example, to viewing status information about their own orders, without permitting them to access any records associated with orders placed by other customers and without permitting them to alter their own records, such as by changing the status, or to create new records, such as by placing a new order. The same company may wish to provide a different scope of access to other external users, such as by permitting third party sales representatives to enter new orders in the system.

A typical prior art system for permitting limited external access to an internal computer network is shown in FIG. 1. An external client system 102 is connected to the Internet 104. An internal network 106 also is connected to the Internet 104 via a network connection 108. The network connection 108 connects a firewall system 110 to the Internet 104 in such a way that all external communications between the internal network 106 and the Internet 104 must pass through the firewall system 110. Internal systems 112, 114, 116 are connected to the firewall system 110 via a switch 118. As a result, all communications between any of the internal systems 112, 114, 116 and the Internet 104 must pass through the firewall system 110.

Typically, an external client system, such as client system 102 of FIG. 1, accesses an internal system connected to an external network, such as the Internet, by sending via the Internet a request addressed to the internal system. Such a request typically must employ an application layer protocol that is suitable for the type of information or service requested from the internal system. For example, a web page may be retrieved by sending a "GET" request under the HyperText Transfer Protocol (HTTP). Under the HTTP protocol, the specific web page desired is identified by a Uniform Resource Locator (URL), which indicates the location of the specific file desired.

For example, to retrieve a web page from internal system 112 of FIG. 1, the client system 102 may provide the URL associated with the file to web browser software installed on the client system 102, which software would in turn send a request to the internal system 112 for the associated file.

Such a request would have to pass through the firewall system 110 to reach the internal system 112. In a typical configuration, the firewall system 110 may be configured to provide certain basic limitations on the access of external systems, such as external client system 102, to the data and other services that may be available on the internal systems that the firewall is configured to protected. For example, the firewall system may be configured to block all external network traffic addressed to the Internet Protocol (IP) address associated with a particular internal system, such as by blocking all traffic to the IP address associated with internal system 112, while permitting such traffic to internal systems 114 and 116. In certain cases, it may be possible to configure the firewall system 110 to block only that external traffic associated with one or more specified URL's associated with a particular internal system, permitting external traffic associated with other URL's associated with the same internal system.

However, typical prior art firewall systems are not able to distinguish between like requests from different parties based solely on all or part of the content of the request itself, nor to permit one requesting party a first level of access and a second party a second level of access to the same internal database or application, for example. Typically, in order to implement such finer distinctions special computer code must be written for each system and application affected and for each such distinction to be made. It can be costly and inefficient to prepare such custom scripts to implement application-level security (i.e., rules controlling access to a particular application).

Therefore, there is a need for a way to control external access to an internal computer network based on the content of incoming requests without the need to write custom computer code at the internal network level. Moreover, there is a need for a way to exercise such control beyond the techniques currently available for limiting access based on the destination IP address and/or URL associated with the request.

SUMMARY OF THE INVENTION

Accordingly, a system and method are disclosed for providing security for external access to a protected computer network based on the content of incoming requests. Instead of sending requests directly to the internal system on which the desired data is available or target application is running, the external client system sends its request to a firewall configured to mediate communications between external systems and the protected internal system. Rather than merely monitoring traffic between the internal system and external systems, the mediating firewall described herein receives and interprets requests and, if appropriate, sends its own request to and receives a response from the internal system to enable the mediating firewall to send an appropriate response to the external client system.

It should be appreciated that the present invention can be implemented in numerous ways, including as a process, an apparatus, a system, a device, a method, or a computer readable medium such as a computer readable storage medium or a computer network wherein program instructions are sent over optical or electronic or wireless or other kinds of communication links. Several inventive embodiments of the present invention are described below.

A method for providing controlled access via an external network to a resource residing on an internal network is disclosed. In one embodiment, an external request addressed to a first computer system associated with the internal network is received at the first computer system via the external network. In one embodiment, the external request comprises a request from a requesting party for response data from a second computer system associated with the internal network. At least part of the content of the external request is analyzed at the first computer system to determine whether the request is authorized. If it is determined that the request is authorized, the request is processed.

In one embodiment, an external request sent via an external network and addressed to a first computer system associated with an internal network is received at the first computer system. In one embodiment, the external request comprises a request from a requesting party for response data from an application program running on a second computer system associated with the internal network. Application-level security is implemented at the first computer system by analyzing at least part of the content of the external request to make a determination as to how the request should be processed. The analysis comprises applying a decision tree configured to determine in the least number of computations possible how the request should be processed. The request is processed in accordance with the determination.

A system for providing controlled access via an external network to a resource residing on an internal network is disclosed. In one embodiment, the system comprises an external network connection configured to receive an external request sent via the external network. In one embodiment, the external request is addressed to a first computer system associated with the internal network and comprises a request for response data from a second computer system associated with the internal network. The system further comprises a processor associated with the first computer system associated with the internal network. The processor is configured to analyze at least part of the content of the external request to determine whether the request is authorized and process the request in the event it is determined that the request is authorized. The system further comprises an internal network connection configured to enable an internal request to be sent via the internal network to the second computer system associated with the internal network.

These and other features and advantages of the present invention will be presented in more detail in the following detailed description and the accompanying figures, which illustrate by way of example, and not by way of limitation, the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

A detailed description of a preferred embodiment of the invention is provided below. While the invention is described in conjunction with that preferred embodiment, it should be understood that the invention is not limited to any one embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

Figure 1:
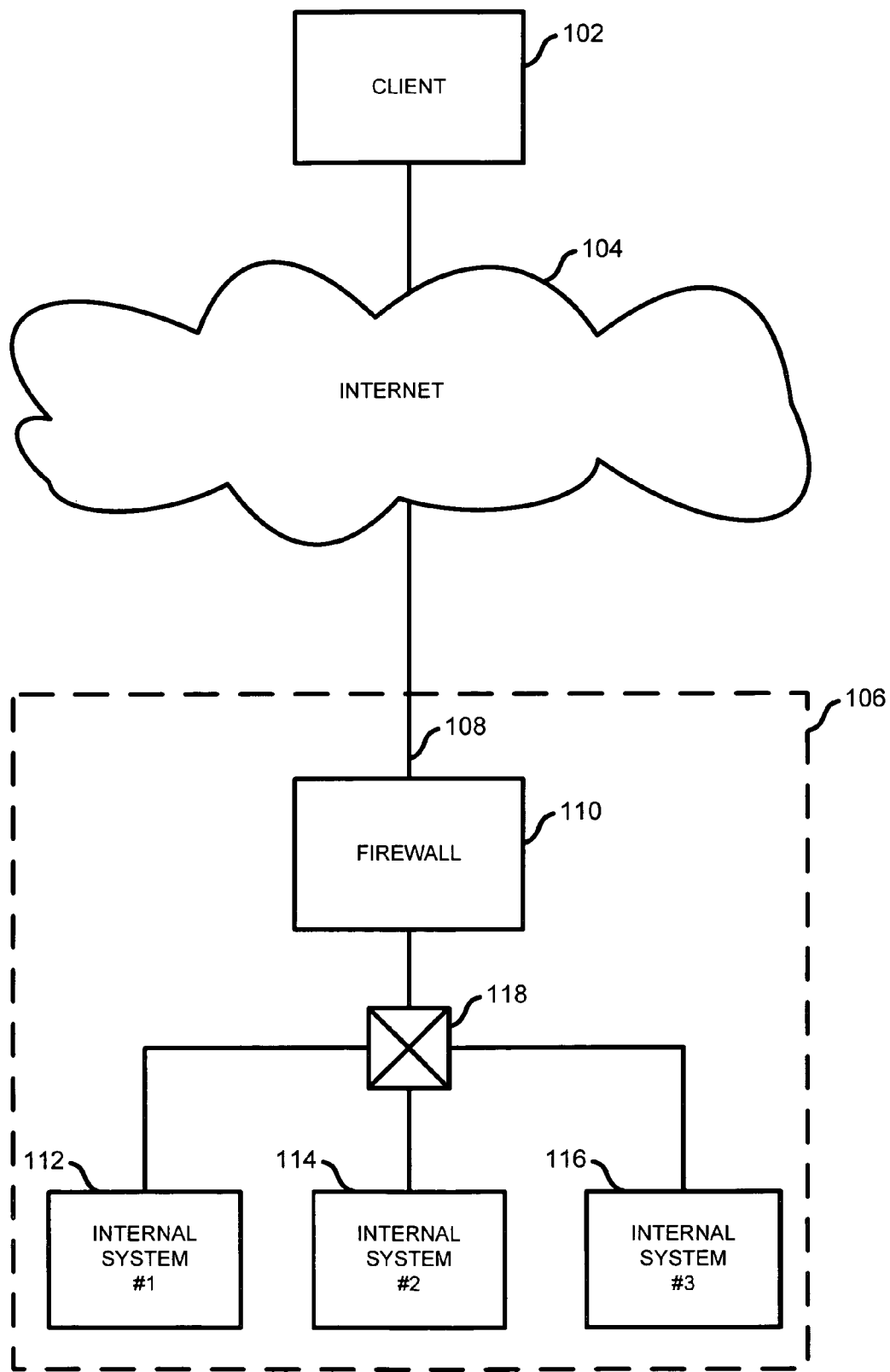
FIG. 1 is a schematic diagram of a typical prior art system for permitting limited external access to an internal computer network.
Figure 2:
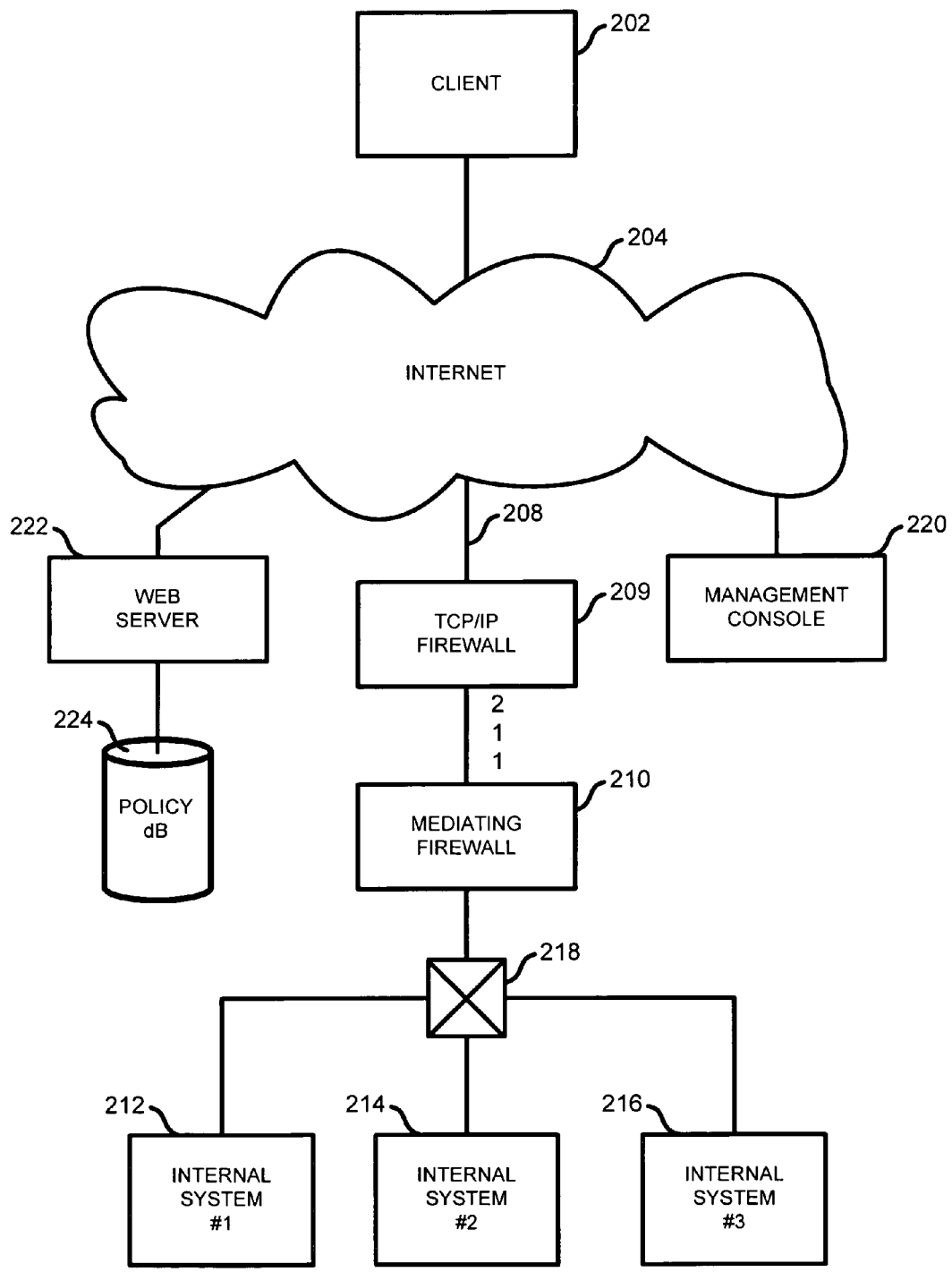
FIG. 2 is a schematic diagram of a system used in one embodiment to provide security for external access to an internal computer system.

FIG. 2 is a schematic diagram of a system used in one embodiment to provide security for external access to an internal computer system. A client system 202 is connected to the Internet 204. A plurality of internal computer systems 212, 214, and 216 associated with an internal network are connected to the Internet via a switch 218, a mediating firewall 210, an external network connection 211, a TCP/IP firewall 209, and an external network connection 208. In one embodiment, the TCP/IP firewall 209 is configured to provide a first level of control on access to the internal network, such as by blocking all messages received via the external network (i.e., the Internet in the embodiment shown in FIG. 2) except those addressed to a particular port number. For example, the TCP/IP firewall may be configured to block all messages except those addressed to "port 80" of one of the plurality of internal computer systems 212, 214, and 216, which is the port typically configured to receive and process HTTP requests. Further control on access, beyond that provided by TCP/IP firewall 209, is provided in one embodiment by mediating firewall 210, based on the content of the messages received via the external network, as described more fully below. In other embodiments, the first level of protection described above as being provided by TCP/IP firewall 209 may instead be provided by the mediating firewall 210, in which case the TCP/IP firewall 209 may be omitted.

In all of the embodiments described herein, the mediating firewall 210 may be considered to comprise a first computer system associated with the internal network, and each of the plurality of internal computer systems 212, 214, and 216 may be considered to comprise, with respect to any particular message requesting data associated with a respective one of said plurality of internal computer systems, a second computer system associated with the internal network, the second system having data requested by a message sent to the mediating firewall (i.e., the first computer system).

A management console 220 is connected via the Internet 204 with a web server 222. The web server 222 is connected to a policy database 224. In one embodiment, the management console 220 is configured to present a user interface to a user with administrative privileges to enable the user with administrative privileges to designate security policies associated with internal computer systems such as internal systems 212, 214, and 216. The term "system administrator" will be used herein to refer to any such user with administrative privileges, and shall include any user or group of users having such privileges. In any particular embodiment or implementation, the term "system administrator" as used herein may refer in one instance or respect to a first user and in another instance or respect to a second user, or may instead refer to the same user or any number of users each performing a different aspect or function with respect to the embodiment being described. In one embodiment, the web server 222 is used to provide a web-based application configured to enable a system administrator to set such policies. Policies entered by the system administrator at the management console 220 are received at the web server 222 and stored in the policy database 224. In one embodiment, the policies configurable by use of the management console include whether certain security procedures such as encryption, authentication, and integrity checking, will be used, and if so, the specific method or protocol to be used for each applicable security measure. In one embodiment, the web-based application may also be used to designate whether external access will be permitted to all or a subset of the resources available on each particular internal system protected by the mediating firewall. In one embodiment, the web application is further configured to enable the system administrator to enter at the management console 220 policy rules for further screening requests sent to the resources with respect to which external requests will be permitted. For example, policy rules may be indicated limiting access based on the content of the request, such as based on the originator of the request and/or the type of request and/or the specific data requested, or the like, as described more fully below. Other rules may be based on the receipt and/or authentication of certificates, credentials, or other techniques for verifying the identity of the sending party, with access being limited to certain external users as verified through such techniques.

As described more fully below, the mediating firewall 210 is configured to implement the policies set by the system administrator or other authorized person through use of the management console 220. In one embodiment, the web server 222 is configured to compile the policies set by the system administrator into an optimal or nearly optimal decision tree, which decision tree is then passed to the mediating firewall 210 to be used by the mediating firewall 210 in processing requests received from external systems, as described more fully below. In one embodiment, the decision tree is a minimum spanning tree constructed based on the policies set by the system administrator, the minimum spanning tree being constructed using well-known techniques for optimizing such processes. In one embodiment, weights are assigned to particular rules based on the computational cost or intensity of different types of rules. For example, a rule requiring access to unencrypted information in the header portion of an HTTP GET request would be considered computationally inexpensive in comparison to a rule that may require more extensive operations to implement, such as a rule that may require access to and analysis of content in the body portion of such a request and/or a rule that would require that content be decrypted prior to being used to process the rule. Techniques for determining the minimum spanning tree for such a set of rules or decisions are well known and are described more fully in publications such as "Network Flows: Theory, Algorithms, and Applications", by Ravindra K. Ahuja, Thomas L. Magnanti, and James B. Orlin, which is hereby incorporated by reference for all purposes.

Figure 3:
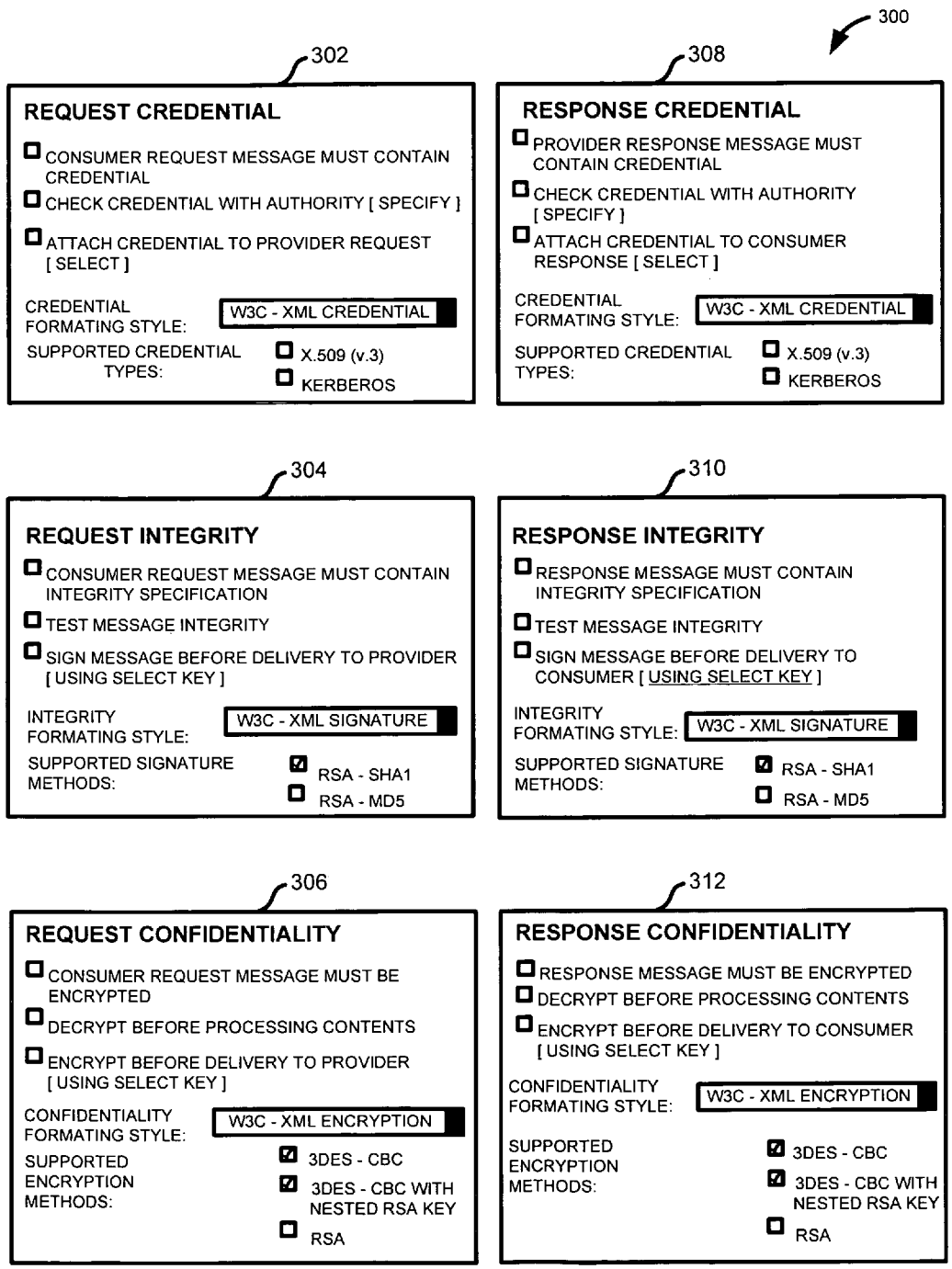
FIG. 3 is an illustration of a portion of a user interface used in one embodiment to enable a system administrator or other authorized person or entity to enter security policies at a management counsel.

FIG. 3 is an illustration of a portion of a user interface used in one embodiment to enable a system administrator to enter security policies at a management counsel such as management console 220. In one embodiment, the security preferences display 300 is displayed to the management console 220 as a web page served by web server 222. In one embodiment, the display 300 would be associated with a particular internal system and application and would be one of several screens that may be associated with the application, as required to enable the system administrator to establish security policies and access rules for each relevant aspect of the application. For example, one instance of the display 300 may be associated with external requests to an internal order management system by a customer while a different instance of display 300 (or a similar display) may be associated with external requests to the same system from a sales representative. The number and nature of such displays used depends in one embodiment on the number of internal systems and applications to be protected and the number and level of distinctions the user of the system seeks to make with respect to each system and/or application.

In our illustrative embodiment, display 300 is shown as comprising one or more of the following entry area 302, 304, 306, 308, 310, and/or 312, each of which is described below.

The display 300 may comprise a request credential preferences entry area 302 in which preferences and policies with respect to authentication of incoming requests may be entered. Under the terminology used in display 300, a "consumer" is a party or system making an external request and a "provider" is the internal system capable of responding to the request, if appropriate. As shown in FIG. 3, in one embodiment, the request credential preference entry area 302 comprises a check box to enable the system administrator to indicate whether a received request must contain a credential in order to be valid. The request credential preferences entry area 302 further comprises a check box to indicate whether any credential included in a request should be checked with a certificate issuing authority. The request credential preference entry area 302 further comprises a link to a further page that would enable the system administrator to specify the certificate issuing authority with which the credential should be checked. The request credential preference entry area 302 further comprises a check box to enable a system administrator to indicate that the mediating firewall should attach a credential to internal requests it sends to the internal system associated with the external request. The request credential preference entry area 302 further comprises a link to a page to enable the system administrator to select the specific credential to be attached to such internal requests. Finally, the request credential preference entry area 302 comprises a drop down menu to select a credential formatting style, and a set of check boxes to enable the system administrator to identify the supported credential types. Well-known, commercially available credential formatting styles include W3C-XML credentials and Microsoft™ WS-Security. Available credential types include, without limitation, X.509 (v.3) certificates and Kerberos certificates.

The display 300 may further comprise a request integrity preference entry area 304, to be used by the system administrator to set preferences with respect to the integrity of incoming requests. The request integrity preference entry area 304 comprises check boxes to enable the system administrator to specify that incoming requests must contain an integrity specification, whether the integrity of such a message should be tested by the mediating firewall, and whether the mediating firewall should attach an integrity specification to any message it may send it to the internal system that will provide the requested service or data. Finally, the request integrity preference entry area 304 comprises a drop down menu to select the integrity formatting style, and a set of check boxes to indicate the signature methods supported by the system. Well-known, commercially available integrity formatting styles include W3C-XML signatures and Microsoft™ WS-Security. Available signature methods include, without limitation, RSA™-SHA1 and RSA™-MD5.

The display 300 may further comprise a request confidentiality preference entry area 306. The request confidentiality preference entry area 306 comprises check boxes to enable the system administrator to indicate whether incoming request messages must be encrypted to be valid, whether incoming request messages should be decrypted by the mediating firewall prior to processing the contents, and whether messages sent by the mediating firewall to the internal system that will provide the requested service or data should be encrypted prior to delivery. If this latter check box is selected, a link is provided to enable the system administrator to select a key to be used for such encryption. Finally, the request confidentially preference entry area 306 comprises a drop down menu to specify a confidentiality formatting style, and a set of check boxes to enable the system administrator to select the encryption methods supported by the system. Well-known, commercially available confidentiality formatting styles include W3C-XML credentials and Microsoft™ WS-Security. Available encryption methods include, without limitation, 3DES-CBC, 3DES-CBC with nested RSA™ key, and RSA™.

The remaining areas of the display 300 can be used to indicate security preferences for responsive messages received by the mediating firewall from the internal system providing the requested service or data and the messages sent by the mediating firewall to the requesting party based on the responsive message received by the mediating firewall from the internal system. The first of these illustrated areas is the response credential preference entry area 308. The response credential entry area 308 comprises check boxes to enable the system administrator to indicate whether a response message received by the mediating firewall from the internal system must contain a credential to be considered valid, whether the credential provided with such a response should be checked with a certificate issuing authority, and whether a credential should be attached to the responsive message sent by the mediating firewall to the requesting party based on the response received by the mediating firewall from the internal system. Links are provided to enable the system administrator to specify a certificate issuing authority to be used to check the credential of the response message and to select a credential to be attached to messages sent from the mediating firewall to the requesting party based on the response received from the internal system. Finally, the response credential preference entry area 308 comprises a drop down menu to enable the system administrator to select a credential formatting style and a set of check boxes to enable the selection of supported credential types.

The display 300 may comprise a response integrity preference entry area 310. The response integrity preference entry area 310 comprises check boxes to enable the system administrator to indicate whether response messages received by the mediating firewall form the internal system in response to the request must contain an integrity specification to be considered valid, whether the integrity of the response message should be tested, and whether the mediating firewall should attach an integrity specification or signature to the message it sends to the requesting party in response to its request based on the response received by the mediating firewall from the internal system. A link is provided to enable the selection of a key to be used to provide any such signature. Finally, the response integrity preference entry area 310 comprises a drop down menu to enable the selection of an integrity formatting style and a set of check boxes to enable the selection of supported signature methods.

The display 300 may comprise a response confidentiality preference entry area 312. The response confidentiality preference entry area 312 comprises check boxes to enable the system administrator to indicate whether response messages received from the mediating firewall, such as mediating firewall 210 of FIG. 2, from the internal system must be encrypted to be considered valid, whether response messages should be decrypted before processing the contents and whether messages sent by the mediating firewall to the requesting party based on the response message received by the mediating firewall from the internal system should be encrypted prior to delivery to the requesting party. In the latter case, a link is provided to enable a selection of a key to be used for such encryption. Finally, the response confidentiality preference entry area 312 comprises a drop down menu to enable the selection of a confidentiality formatting style, and a set of check boxes to enable the selection of supported encryption methods.

As discussed above, the display 300 would be associated with one or more additional pages for use in specifying the content-based policies and rules to be applied by the mediating firewall in processing external requests. Such further pages or other combination of pages may, for example, enable the system administrator to enter rules based on the sender of the message, the destination of the message, or any other information contained in the message, such as a URL or other data identifying a target file, or any other data contained in the request. In one embodiment, the data contained in the request depends at least in part on the application level protocol used to make the request, and the particular additional displays presented to the system administrator are selected at least in part based on the protocol that applies. In one embodiment, the additional displays presented depend at least in part on the internal application with respect to which preferences and policies are being set. In one embodiment, the additional displays presented depend at least in part on a file associated with the data format for incoming requests, such as a document type definition (DTD) file. In one embodiment, a set of policies and preferences may be associated with a DTD or like file, and data entities defined in the DTD may be reference to set policies and preferences.

Figure 4:
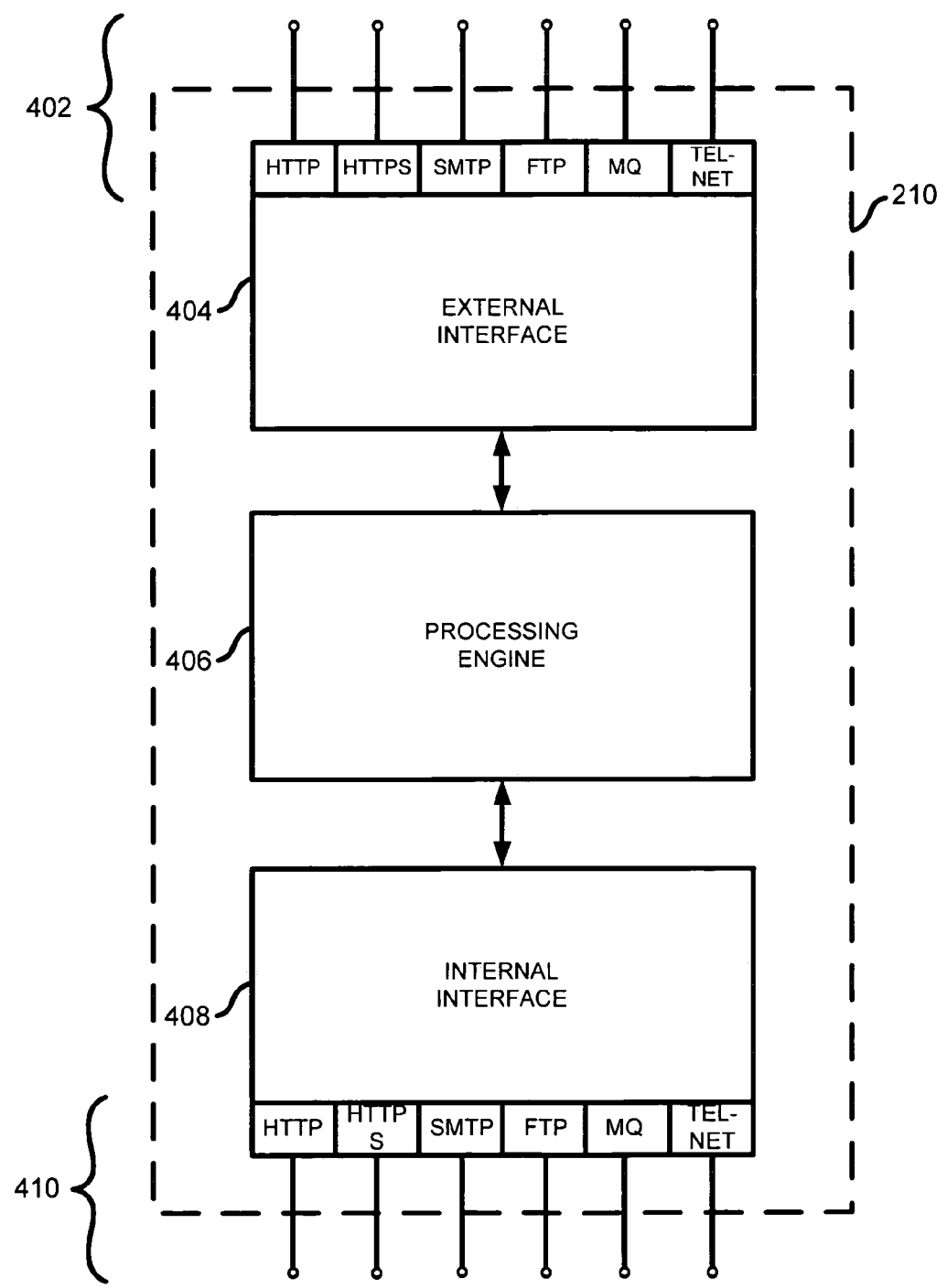
FIG. 4 is a schematic diagram illustrating further detail of a mediating firewall used in one embodiment.

FIG. 4 is a schematic diagram illustrating further detail of the mediating firewall 210 used in one embodiment. The mediating firewall 210 comprises a set of external ports 402, each configured to communicate via an external connection, such as external connection 211 of FIG. 2. Each port of the plurality of ports 402 may be configured to process communications using a specified protocol, such as the hyper text transfer protocol (HTTP); the secure hyper text transfer protocol (HTTPS); the simplified mail transport protocol (SMTP); the file transfer protocol (FTP); any message queue (MQ) protocol, such as Tibco™, IBM MQ Series™, etc.; TELNET; or any suitable application layer protocol. While certain exemplary protocols are shown in FIG. 4, any protocol suitable for communication via a network, such as the Internet, may be used.

The mediating firewall 210 further comprises an external interface 404. In one embodiment, the external interface 404 is configured to perform initial processing on incoming requests, such as by normalizing incoming messages into a common format and, in some cases, performing security-related tasks such as decryption, authentication, and integrity checking, to the extent required by the preferences established by the system administrator and/or to the extent necessary to implement other policy rules.

Once initial processing of an incoming request is performed by the external interface, the request is passed in a common format to a processing engine 406, in which the decision tree developed based on the policies and preferences indicated by the system administrator is employed to determine the proper action to take in response to the request. If it is determined that the request should be processed and the requested information or service obtained for delivery to the requesting party, the processing engine passes the request to the internal interface 408. In one embodiment, the internal interface 408 is configured to communicate via the appropriate protocol with the appropriate internal system to obtain a responsive message that will enable the mediating firewall to send a response to the requesting party to provide the service or data requested by the requesting party. The mediating firewall 210 comprises a plurality of internal ports 410, each of which may be configured to communicate by means of a specified protocol via an internal network with internal computer systems, such as to send a request to such a system to obtain a response to an authorized request received from an external network. As shown in FIG. 4, the internal ports 410 use the same protocols as the corresponding external ports 402. However, in other embodiments, more, fewer, or different protocols may be associated with the plurality of internal ports 410 than with the plurality of external ports 402. In addition, in certain embodiments, the mediating firewall may be configured to receive a request associated with a particular internal system using one protocol but to send a request from the mediating firewall to the internal system using a different protocol. For example, the mediating firewall may be configured to receive an external request in HTTP but to send internal requests to the associated internal system using FTP.

In one embodiment, the internal interface 408 is used to prepare and send a message from the mediating firewall to the internal system associated with a received external request in accordance with the policy rules as applied by the processing engine 406. For example, the policy rules may specify that the request be formatted in a particular way; that it be encrypted, authenticated, and/or signed in a particular way or ways; and that it be sent using a particular protocol, such as message queue, to the internal system, regardless of the protocol used by the requesting party to make the request.

The response from the internal system to the mediating firewall is likewise received via an internal network connection to the mediating firewall at one of the internal ports 410. In one embodiment, the internal interface 408 receives and performs initial processing on the response received from an internal system, such as one of the plurality of internal systems 212, 214, and 216 of FIG. 2, such as by decrypting the response and/or checking the authentication and/or integrity of the response, in accordance with the security preferences established by the system administrator. In one embodiment, the internal interface then passes the responsive message to the processing engine for processing. In one embodiment, the processing engine is configured to extract the responsive data from the response message received from the internal system and incorporate the response data in a response formatted in accordance with the policy rules set by the system administrator. The responsive message is then passed by the processing engine 406 to the external interface 402 for delivery to the requesting party via the external port (i.e., the particular one of the plurality of external ports 402 of FIG. 4) on which the incoming request was received and using the application protocol used by the requesting party to send the request.

As noted above, the present disclosure uses the term "system administrator" to refer to any user or users authorized to establish policies and preferences with respect to the mediating firewall, such as by using a management console such as management console 220 of FIG. 2 to establish such policies and preferences, or by using any other user interface that may be provided to enable a user to establish such policies.

As noted above, instead of being configured to monitor network traffic addressed to internal systems, the mediating firewall in one embodiment is configured in such a way that requests for services and data from internal systems associated with the mediating firewall are addressed by external systems to the mediating firewall itself. For example, the IP address and port number of the mediating firewall would be used by an external system as the destination IP address and port number to which any requests for data or other services from an internal system associated with the mediating firewall, instead of using the IP address and port number of the internal system itself.

Likewise, the messages sent by the mediating firewall 210, such by operation of the internal interface 408 of FIG. 4, appear to the internal systems associated with the mediating firewall as having originated from the mediating firewall itself and not as having originated from an external system. In this way, the internal systems need not be configured to discriminate between incoming requests, such as on the basis of the source IP address and port number of the incoming request, because all internal requests sent to an internal system as a result of the receipt by the mediating firewall of a request from outside the internal network originate from the mediating firewall. The internal systems could, but need not, be configured to implement any security measures with respect to the external request, because, for example, all required security measures have been implemented at the mediating firewall, prior to any request being sent by the mediating firewall to an internal system. Likewise, responsive messages are sent by the internal systems not directly to the external requesting party, but instead to the mediating firewall. Upon receipt of the responsive message, the mediating firewall extracts the responsive data and prepares a message to be delivered to the requesting party from the mediating firewall to the requesting party. In this way, a further measure of security is provided in that the IP address and port numbers associated with internal systems, as well as the data and request formats and protocol used internally, as described more fully below, may be hidden from external users.

Figure 5:
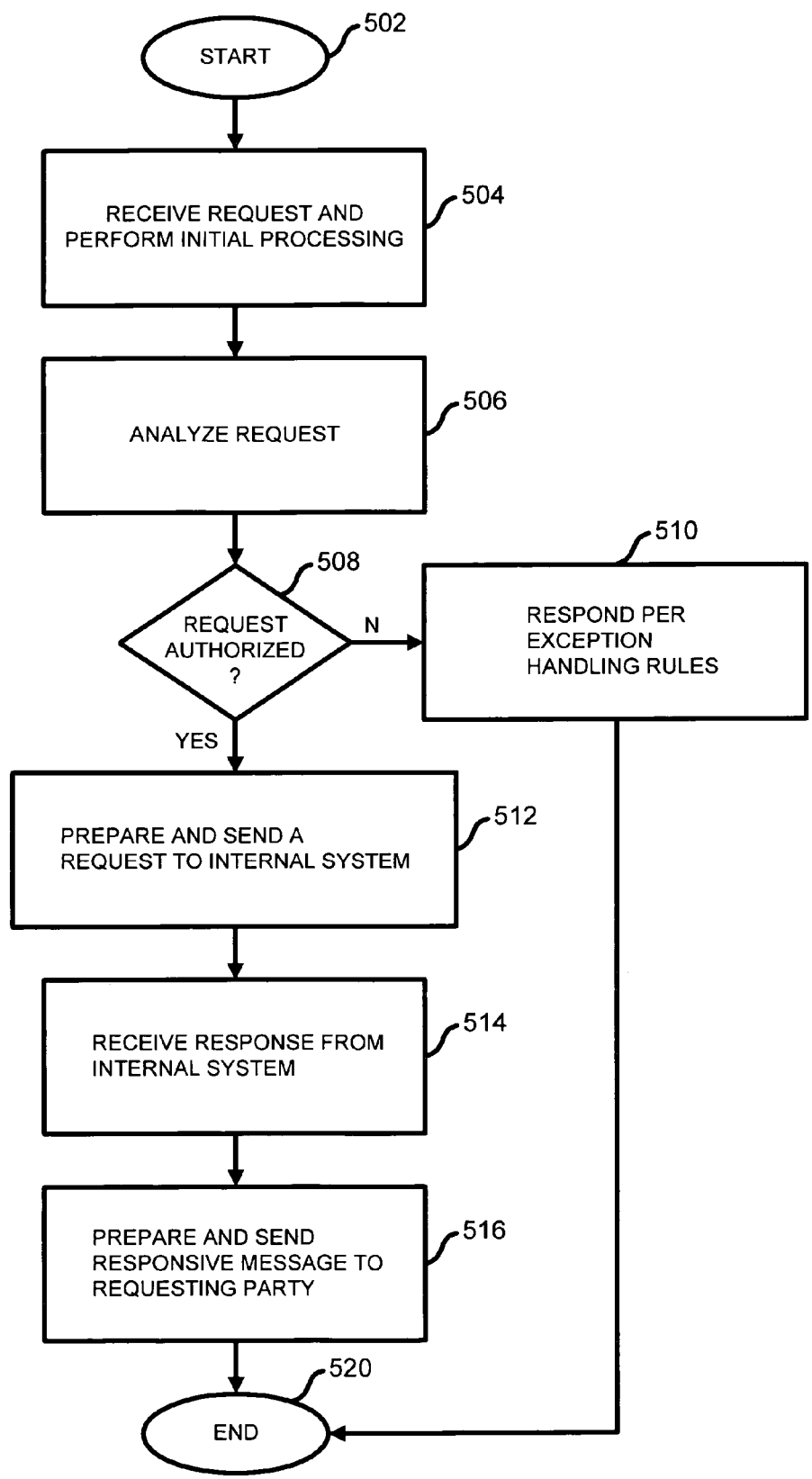
FIG. 5 is a flow chart illustrating a process implemented in one embodiment on a mediating firewall to process requests received from external systems and to provide responses to such requests based on data received from internal systems.

FIG. 5 is a flow chart illustrating a process implemented in one embodiment on a mediating firewall, such as mediating firewall 210 of FIG. 2, to process requests received from external systems and to provide responses to such requests based on data received from internal systems. Referring to FIG. 4, in one embodiment, the respective steps of the process shown in FIG. 5 may be performed by the external interface 404, the processing engine 406, and/or the internal interface 408, as appropriate for a particular implementation. The process shown in FIG. 5 starts at step 502 and proceeds to step 504 in which a request is received by the mediating firewall from an external system and initial processing is performed by the mediating firewall. In step 506 the request is analyzed. In step 508 it is determined whether the request is one that the external requesting party is authorized to make of the associated internal system. If it is determined in step 508 that the request is not authorized, the process proceeds to step 510 in which event the mediating firewall responds to the request in accordance with the exception handling rules designated by the system administrator. In one embodiment, the firewall may be configured to respond to an unauthorized request by ignoring the request. In one embodiment, the mediating firewall may be configured to respond to an unauthorized request by sending a message to the requesting party indicating that the request is not authorized. In one embodiment, the mediating firewall may be configured to send an alert, such as an e-mail message or page to a system administrator, alerting the system administrator to the fact that an unauthorized request has been received. Once the exception handling rules have been implemented in step 510, the process for an unauthorized request ends in step 520.

If it is determined in step 508 that the request is one that the requesting party is authorized to make of the internal system, the process proceeds to step 512 in which event the mediating firewall prepares and sends to the internal system at which the data and/or service requested by the requesting party is available an internal request requesting that the internal system send to the mediating firewall the data needed to respond to the requesting party's request. In one embodiment, the protocol used to send the internal request may be different than the protocol used by the external requesting party to send the external request. In one embodiment, the protocol, data format, and security procedures used for the internal request may be prescribed by a user associated with the internal network being protected by the mediating firewall using a web-based interface, such as described above in connection with FIG. 3.

In step 514, a response message is received by the mediating firewall from the internal system responding to the internal request sent by the mediating firewall to the internal system.

In step 516, the mediating firewall prepares and delivers to the requesting party an external responsive message based on the response message received by the mediating firewall from the internal system. The process then ends in step 520.

Figure 6:
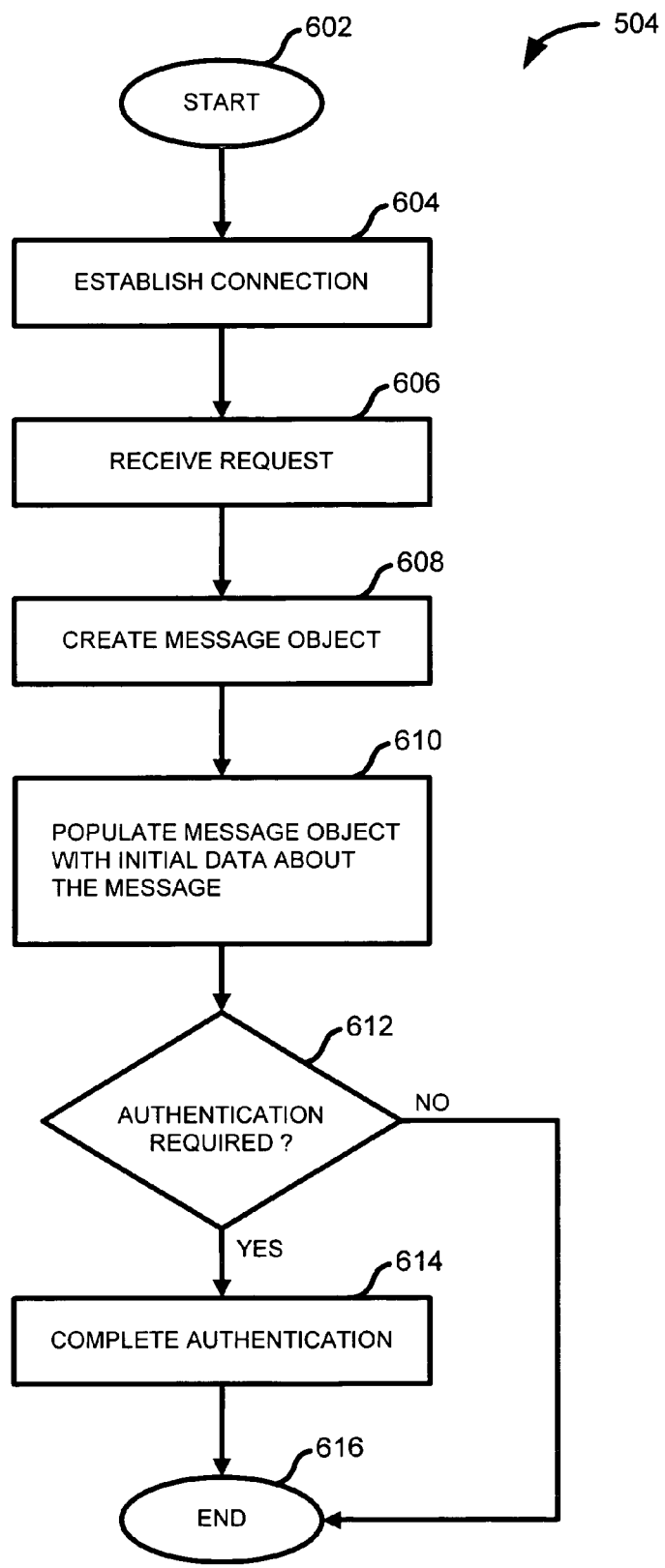
FIG. 6 is a flow chart illustrating a process implemented in one embodiment on a mediating firewall to receive and perform initial processing on a request from an external user.
Figure 7:
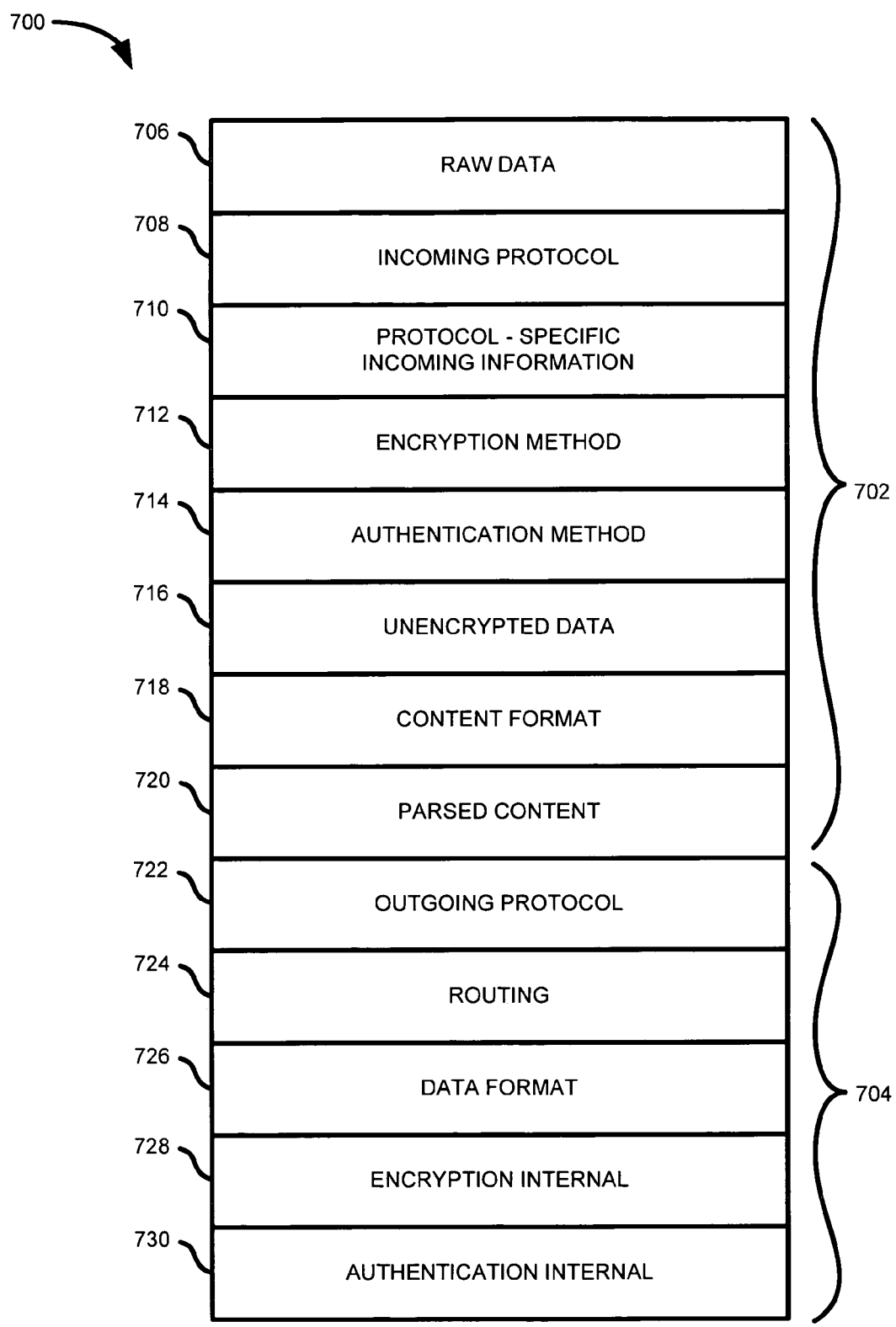
FIG. 7 is a schematic diagram of a message object used in one embodiment to normalize all requests received by the mediating firewall into a common format.
Figure 8:
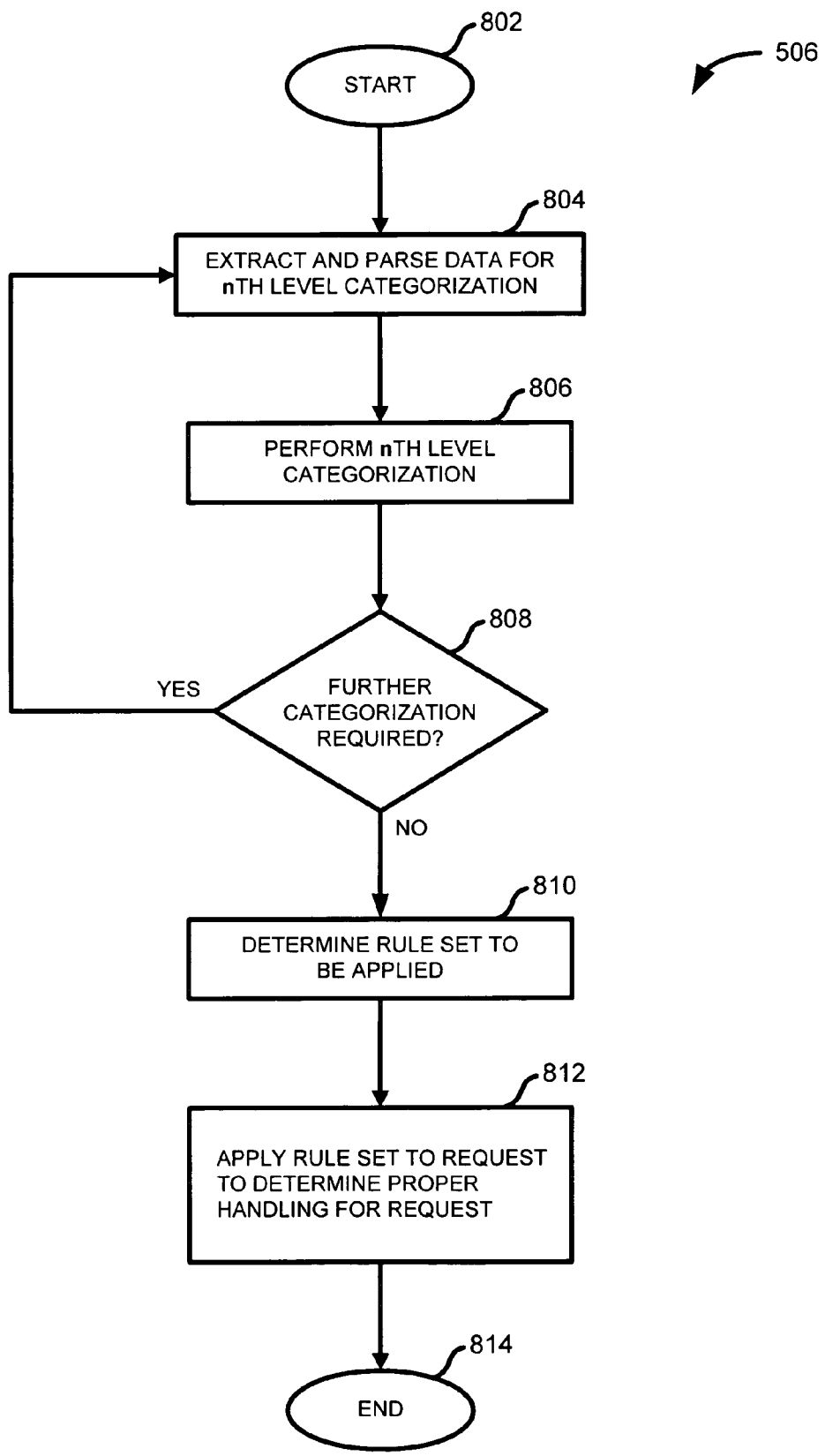
FIG. 8 is a flow chart illustrating a process used in one embodiment to analyze requests received from external systems.
Figure 9:
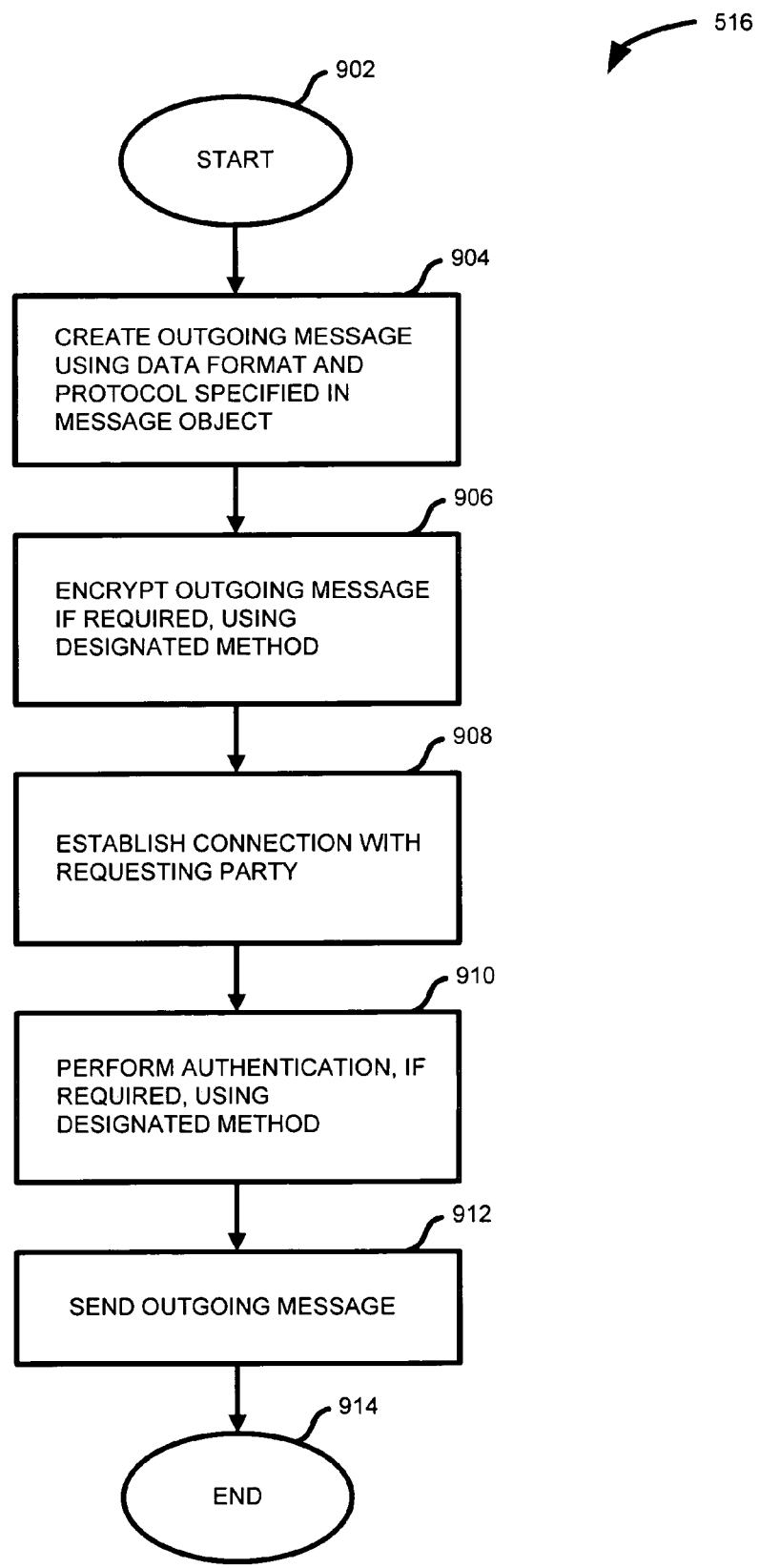
FIG. 9 is a flowchart illustrating a process used in one embodiment to prepare and send a responsive message to a requesting party based on information received from an internal system in response to an internal request sent by the mediating firewall to obtain the information needed to respond to the requesting party.

FIGS. 6, 8, and 9, discussed below, illustrate the processes used in one embodiment to perform steps 504, 506, and 516, respectively, of the process shown in FIG. 5. FIG. 7 illustrates an exemplary message object used in one embodiment to store and manipulate data concerning a message received via an external network. FIGS. 6 through 9 are discussed in order immediately below, beginning with FIG. 6.

FIG. 6 is a flow chart illustrating a process implemented in one embodiment on a mediating firewall to receive and perform initial processing on a request from an external user, as in step 504 of FIG. 5. The process starts in step 602 and proceeds to step 604 in which a connection is established between the external system being used by the requesting party and the mediating firewall. In one embodiment, the external system communicates with the mediating firewall via the Internet using the TCP/IP suite of protocols. In such an embodiment, in step 604 of the process shown in FIG. 6 a TCP connection is established between the external client system being used by the requesting party on the one hand and the mediating firewall on the other hand.

In step 606, a request from the requesting party is received by the mediating firewall via an external network connection, such as an external connection to the Internet. In step 608, a message object associated with the request is created. In step 610, certain basic data from the request is used to provide values for at least certain of the variables of the message object.

In step 612, it is determined whether any authentication-related procedures must be completed with respect to the request. In one embodiment, the mediating firewall consults the policy database via a network connection to determine whether requests of the type received require the completion of authentication procedures. If it is determined in step 612 that authentication is not required, the process proceeds to step 616, in which event the process ends. If it is determined in step 612 that authentication is required, the process proceeds to step 614 in which the required authentication procedures are completed. For example, in one embodiment, as described above, the mediating firewall may be configured to perform such tasks as verifying that an authentication certificate in the proper format and of a supported type is attached to the request and/or checking with a specified credential issuing authority to confirm that the certificate is valid and associated with the requesting party. Once the required authentication procedures have been completed in step 614, the process ends in step 616.

FIG. 7 is a schematic diagram of a message object used in one embodiment to normalize all requests received by the mediating firewall into a common format, such as the message object created in step 608 of the process shown in FIG. 6. The message object 700 comprises an incoming request portion 702 and an internal interface portion 704. The incoming request portion 702 comprises a raw data area 706 in which the incoming request is stored in the form in which it was received. In an area 708, the protocol used by the requesting party to make the request is identified. In an area 710, protocol-specific information is stored. In one embodiment, the protocol-specific information stored in the area 710 is determined by the protocol used by the requesting party to make the request in accordance with rules established by the system administrator described above. For example, protocol-specific information stored in area 710 may comprise information such as the source and/or destination IP address and port number identified in the request, the URL of the file requested, information from a header area associated with the protocol, such as an HTTP header, an identification of the type of content included in the request, and/or an identification of a mail server used to make the request such as a request using the SMTP protocol.

The message object 700 further comprises an encryption method storage area 720 in which the encryption method used to encrypt the incoming request is stored. The message object 700 further comprises an authentication message storage area 714 in which the authentication method used in connection with the request is stored.

In area 716 of message object 700, unencrypted data is stored. For example, if the data included in a request is received in encrypted form and then decrypted by the mediating firewall, the unencrypted data obtained by the process of decryption will be stored in the unencrypted data area 716. The message object 700 further comprises a content format identification area 718 in which an identification of the content included in the request may be stored. For example, the content may be received as plain text, as comma-separated values (CSV), or in some other format. The message object 700 further comprises a parsed content storage area 720 used in one embodiment to store a subset of content extracted from the request to be used by the mediating firewall to apply the decision tree that will be used by the firewall to analyze the request and determine whether it is authorized.

Each of the above-described parts of the message object 700 comprises part of the incoming request portion 702 of the message object. Each area described above may comprise a plurality of associated areas, depending on the number of data entities to be stored. For example, if a request comprises content in two different formats, the content format area 718 of the message object 700 may comprise two data entities, one for each type of content. Likewise, the parsed content area 720 may comprise multiple entities, depending on how many elements of data must be extracted from the message for processing in accordance with the applicable decision tree. In addition, a particular instance of the message object will only have associated with it those areas applicable to the request with which the request is associated. For example, if a particular request does not require either encryption or authentication, the instance of the message object associated with that request would not have values for the encryption method area 712 or the authentication method area 714.

The internal interface portion 704 of the message object 700 comprises an outgoing protocol identification area 722, in which an identification of the protocol to be used by the mediating firewall to communicate with the internal system associated with the request may be stored.

The internal interface portion 704 of message object 700 further comprises a routing information area 724 in which information needed by the mediating firewall to route requests to the correct internal system associated with the request may be stored. The internal interface portion 704 further comprises a data format identification area 726 in which an identification of the data format to be used by the mediating firewall to make requests of the internal system associated with the requesting party's request may be stored. The internal interface portion 704 further comprises an internal encryption method identification area 728 in which an identification of the encryption method to be used by the mediating firewall to encrypt messages sent to the internal system associated with the requesting party's request may be stored. Finally, the internal interface portion 704 comprises an internal authentication identification area 730 in which an indication is stored of the authentication method, if any, that the mediating firewall must use to authenticate requests sent by the mediating firewall to the internal system associated with the requesting party's request.

In other embodiments, the message object will comprise those entities that may be necessary to enable the mediating firewall to implement the respective decision tree associated with each type of incoming request that the mediating firewall may be configured to process.

FIG. 8 is a flow chart illustrating a process used in one embodiment to analyze requests received from external systems, as in step 506 of the process shown in FIG. 5. The process begins with step 802 and proceeds to step 804 in which event data required for the first level of categorization of the message is extracted from the message and parsed. In step 806, the data extracted from the message and parsed in step 804 is used to perform a first level categorization of the message. For example, a first level categorization may require the identification of the protocol by which the request was sent. Depending on the nature of the request and the protocol used, the first level categorization may also involve use of such information as the destination IP address and port number used to make the request and/or the URL used to identify the file requested. In step 808, it is determined whether further categorization of the request is required to determine which decision tree the mediating firewall should use to determine the appropriate action in response to the request. For example, in one embodiment the first level categorization may be used to determine that the request was sent using the HTTP protocol. In one such embodiment, a further level of categorization may be performed by extracting information from the header portion of the HTTP request message, such as the destination IP address and port number and/or the URL requested.

If it is determined in step 808 that further categorization is required, the process returns to step 804 in which data required for the next level of categorization is extracted from the request message and parsed. The next level of categorization is then performed in step 806 and in step 808 it is determined whether any further categorization is required. The steps 804 through 808 are repeated as necessary for a particular request until the request has been categorized to the extent necessary to determine which decision tree provided to the mediating firewall based on the policies established by the system administrator should be used to analyze the request.

Once it has been determined in step 808 that no further categorization is required, the process proceeds to step 810 in event which the decision tree to be applied to requests is identified. In step 812, the appropriate decision tree is applied to the request to determine the proper handling of the request. In one embodiment, no separate categorization is performed prior to applying the decision tree and a single decision tree is used to analyze all external requests. In one such embodiment, data extracted in the manner described above in connection with steps 804-808 is used to make a determination at successive nodes of the applicable decision tree until a determination has been made as to the proper handling of the request. For example, the applicable decision tree may be followed for particular requests in one embodiment until a decision has been made that the message is either authorized, in which case the mediating firewall prepares and sends a request to the appropriate internal system to obtain the information necessary to send a responsive message to the requesting party, or not authorized, in which case the request is either ignored or responded to with an error message. Once the appropriate rule set has been applied in step 812, the process shown in FIG. 8 ends in step 814.

FIG. 9 is a flowchart illustrating a process used in one embodiment to prepare and send a responsive message to a requesting party based on information received from an internal system in response to an internal request sent by the mediating firewall to obtain the information needed to respond to the requesting party, as in step 516 of the process shown in FIG. 5. The process shown in FIG. 9 starts in step 902 and proceeds to step 904 in which event an outgoing message directed to the requesting party is created using the data format and protocol specified in the message object for the responsive message. In one embodiment, the data format and protocol used for the outgoing message are the same as the data format and protocol used by the requesting party to make the request. In one embodiment, data indicating the protocol and data format used in the original request is stored in the message object in appropriate data fields, such as data field 708 and 718 of the message object shown in FIG. 7.

In step 906 of the process shown in FIG. 9, the outgoing message is encrypted, if required, using the method designated in the policy database for encrypting outgoing responsive messages to the external requesting party. In step 908, a connection is established with the requesting party. In one embodiment; the external connection is established via the Internet and the TCP/IP suite of protocols is used to establish the connection with the requesting party.

In step 910, any required authentication is performed, using the method designated in the policy database for performing authentication with respect to outgoing responsive messages to an external requesting party. In step 912, the outgoing message is sent to the requesting party and the connection to the requesting party is terminated. The process shown in FIG. 9 then ends in step 914.

FIGS. 10A through 10E illustrate a process using one embodiment to apply a decision tree to a received request in a specific, hypothetical embodiment. The portion of the process shown in FIG. 10A corresponds to the initial extraction of data and categorization described above in connection with steps 804 through 810 of the request analysis process shown in FIG. 8. The portion of the process shown in FIGS. 10B through 10E, reflect the application of a particular rule set based on the categorization, as in step 812 of the process shown in FIG. 8.

In the hypothetical embodiment illustrated in FIGS. 10A through 10E, it is assumed that the hypothetical operator of the internal systems protected by the mediating firewall has adopted the policy that external requests to the internal systems will only be accepted and processed if they are received at "port 80" of the mediating firewall (i.e., the one of the plurality of ports, such as the plurality of ports 402 of FIG. 4, that is designated as "port 80") and if the HTTP protocol is used to make the request. It is further assumed that three internal systems are protected by the mediating firewall. The three systems are assumed to be a customer relationship management (CRM) system, an order management system, and a financial system. Such systems are in widespread use in corporate computer networks, and are available commercially from vendors such as Siebel™, PeopleSoft™, and SAP™. It is further assumed that the system administrator has established a policy on the mediating firewall that only independent sales representatives may access the CRM system, and only for limited purposes, such as only to access data associated with accounts serviced by the particular requesting sales representative. It is further assumed that such sales representatives will be able to modify only records reflecting the sales representative's own contacts with the customer. It is further assumed that a policy is established that permits either independent sales representatives or customers to access information on the order management system, but to different extents. For example, sales representatives may be permitted to access order management records for customers associated with the sales representative, with access being limited to having the ability to place a new order on behalf of customers associated with the sales representative or to check the status of previously-placed orders. With respect to customers, access to the order management system may be limited, for example, to requests placed from a particular work station at the customer site, for security purposes, for example, and limited in nature to checking the status of the customer's own orders. Finally, access to the financial system is limited in this hypothetical case to customers, with sales representatives having no access to the financial system. Customers are limited in their access to checking the status of invoices associated with the customer and checking the amount of credit presently available to the customer for placing new orders. In the hypothetical case, customers are to be prevented from modifying or deleting any records in the financial system. The implementation of the above policies in a decision tree process such as may be implemented on the mediating firewall described herein is illustrated in FIGS. 10A through 10E.

Figure 10A:
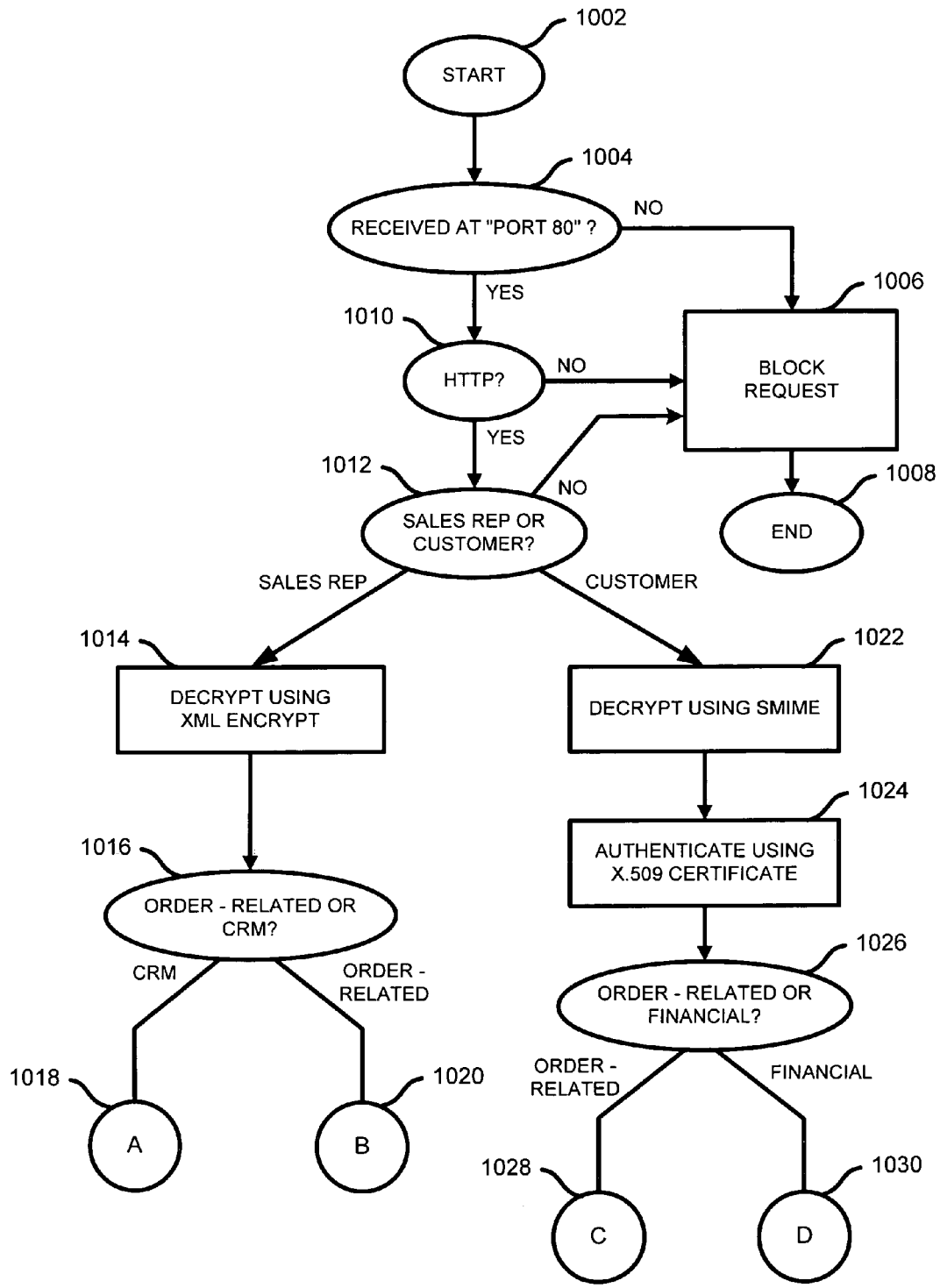
FIGS. 10A through 10E illustrate a process using one embodiment to apply a decision tree to a received request in a specific, hypothetical embodiment.
Figure 10B:
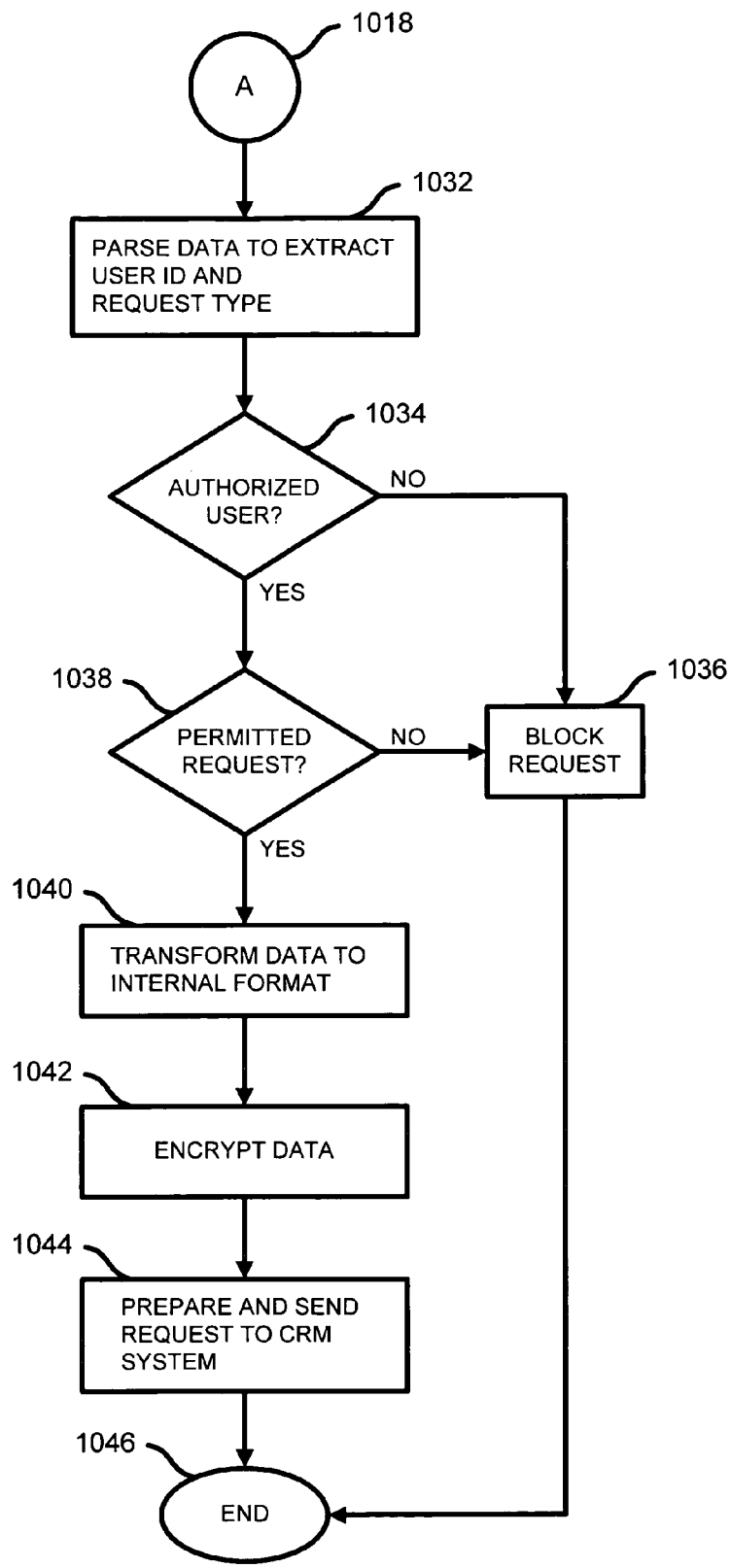

Beginning with the portion of the process shown in FIG. 10A, the process starts in step 1002 and proceeds to step 1004 in which it is determined whether the incoming request was received by the mediating firewall at "port 80". If the incoming request was not received at "port 80", the process proceeds to step 1006 in which the request is blocked. In one embodiment, the system administrator may establish exception policies for determining what specific action is taken in the event of a blocked request. For example, in one embodiment a blocked request may be ignored. In one embodiment, the system administrator may specify that an error message be sent to the requesting party in the case of a blocked request. In one embodiment, a page or other alert may be sent to a security administrator alerting a security administrator to the fact that an unauthorized request has been received. If a request is blocked in step 1006, the process shown in FIG. 10A ends in step 1008. If in step 1004 it is determined that the incoming request was received at "port 80", it is determined in step 1010 whether the HTTP protocol was used to send the request. If it is determined in step 1010 if a protocol other than the HTTP protocol was used to send the request, the process proceeds to step 1006 in which the request is blocked and proceeds to step 1008 in which the process ends. If it is determined in step 1010 that the HTTP protocol was used to send the request, the process proceeds to step 1012 in which it is determined whether the requesting party is a sales representative or a customer. In one embodiment, sales representatives and customers are provided with identification information, such as a company name or code to be included in their requests for information from internal systems protected by the mediating firewall. In one such embodiment, this identifying information is extracted from the message received and used to determine whether the message was originated by a sales representative or a customer. In one embodiment, a list of IP addresses and port numbers associated with sales representatives and customers, respectively, is maintained and used to determine whether a received request was originated by either a sales representative or a customer. In other embodiments, other identifying information may be extracted from the received message to make the determination.

If it is determined in step 1012 that the request was received from a party that is neither a sales representative nor a customer, the process proceeds to step 1006 in which the request is blocked and proceeds to step 1008 in which the process ends. If it is determined in step 1012 that the request was originated by a sales representative, the process proceeds to step 1014 in which event the received message is decrypted using HML encrypt. In one embodiment, the decryption performed in step 1014 is determined by the system administrator by making selections in a user interface such as the display 300 shown in FIG. 3. In one such embodiment, sales representatives are informed in advance that the XML encryption method should be used for any requests sent by the sales representative to the mediating firewall for access to an internal system associated with the mediating firewall. Once a sales representative request has been decrypted in step 1014, the process proceeds to step 1016 in which event it is determined whether the request is a request for the order management system or a request for the customer relationship management system. In one embodiment, data is extracted from the request to determine whether it is an order-related request or a CRM-request. For example, in one embodiment, it may be determined in step 1016 whether the data portion of the request matches the document type definition (DTD) associated with requests to the customer relationship management system. In one embodiment, if the request matches the DTD for the CRM system, the process shown in FIG. 10A proceeds to step 1018 at which point the CRM system decision tree shown in FIG. 10B starts as described more fully below. If, on the other hand, the request does not match the DTD of the CRM system, it is assumed in one embodiment in step 1016 that the request is a request for the order management system and the process shown in FIG. 10A proceeds to step 1020, at which point the order management system decision tree process illustrated in FIG. 10C starts, as described more fully below.

If it is determined in step 1012 that a customer sent the request, the process shown in FIG. 10A proceeds to step 1022 in which the request is decrypted using SMIME. In one embodiment, customers are instructed to encrypt requests sent to the mediating firewall using SMIME and the mediating firewall is configured to decrypt such requests using SMIME based on preferences selected by the system administrator, as described above. In step 1024, a further security step is taken with respect to customer requests, as compared to sales representative requests, in the form of performing authentication using an X.509 certificate. For example, the system administrator may have required such authentication for customer-originated requests because customers may access the financial system, whereas sales representatives may not. In step 1026, it is determined whether the customer's request is directed to the order management system or to the financial system. If it is determined in step 1026 that the customer's request is directed to the order management system, the process proceeds to step 1028, at which point the decision tree process shown in FIG. 10D for processing customer-originated requests to the order management system starts, as described more fully below. If it is determined in step 1026 that the customer-originated request is a request to the financial system, the process proceeds to step 1030 at which point the financial system request decision tree process shown in FIG. 10E starts as described more fully below.

Figure 10C:
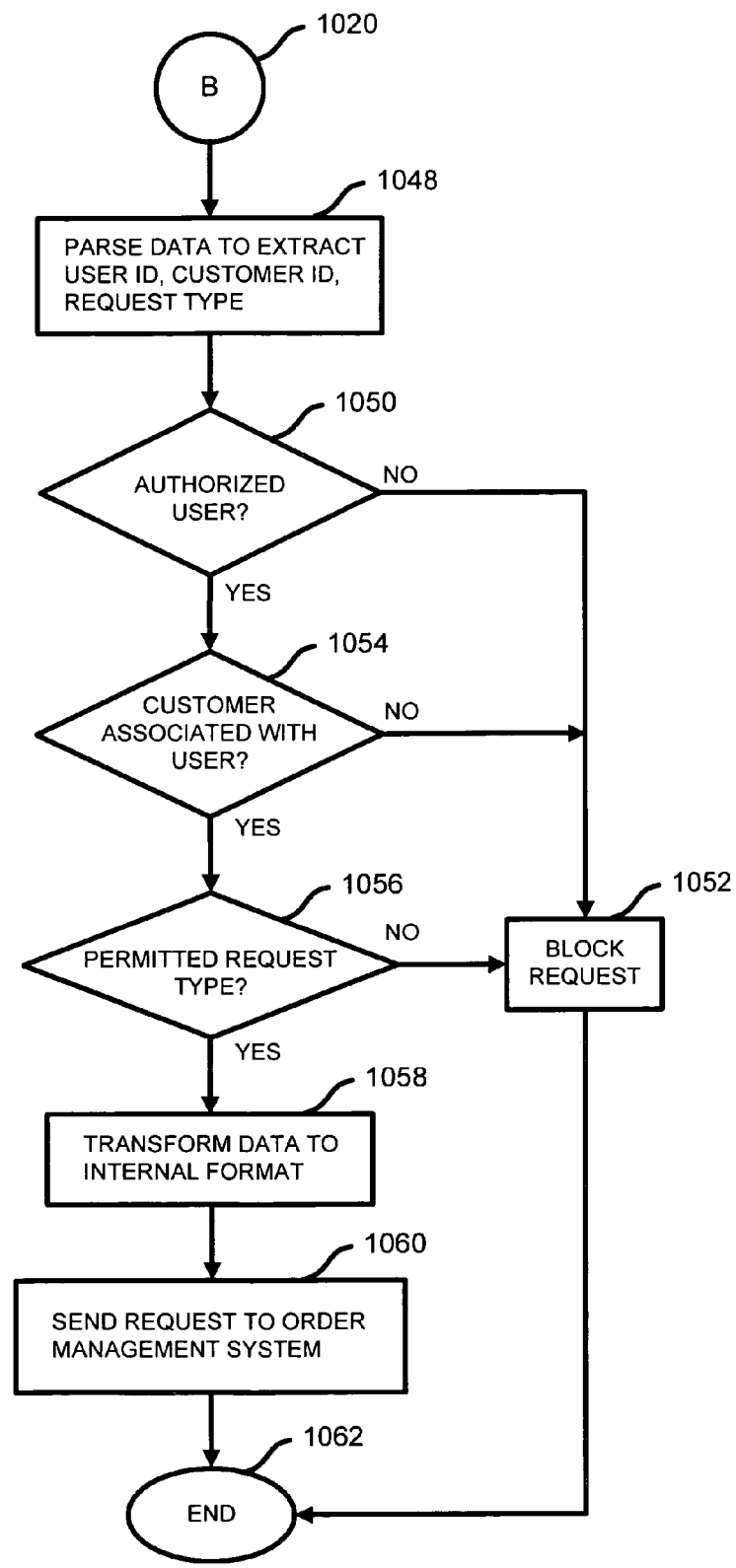
Figure 10D:
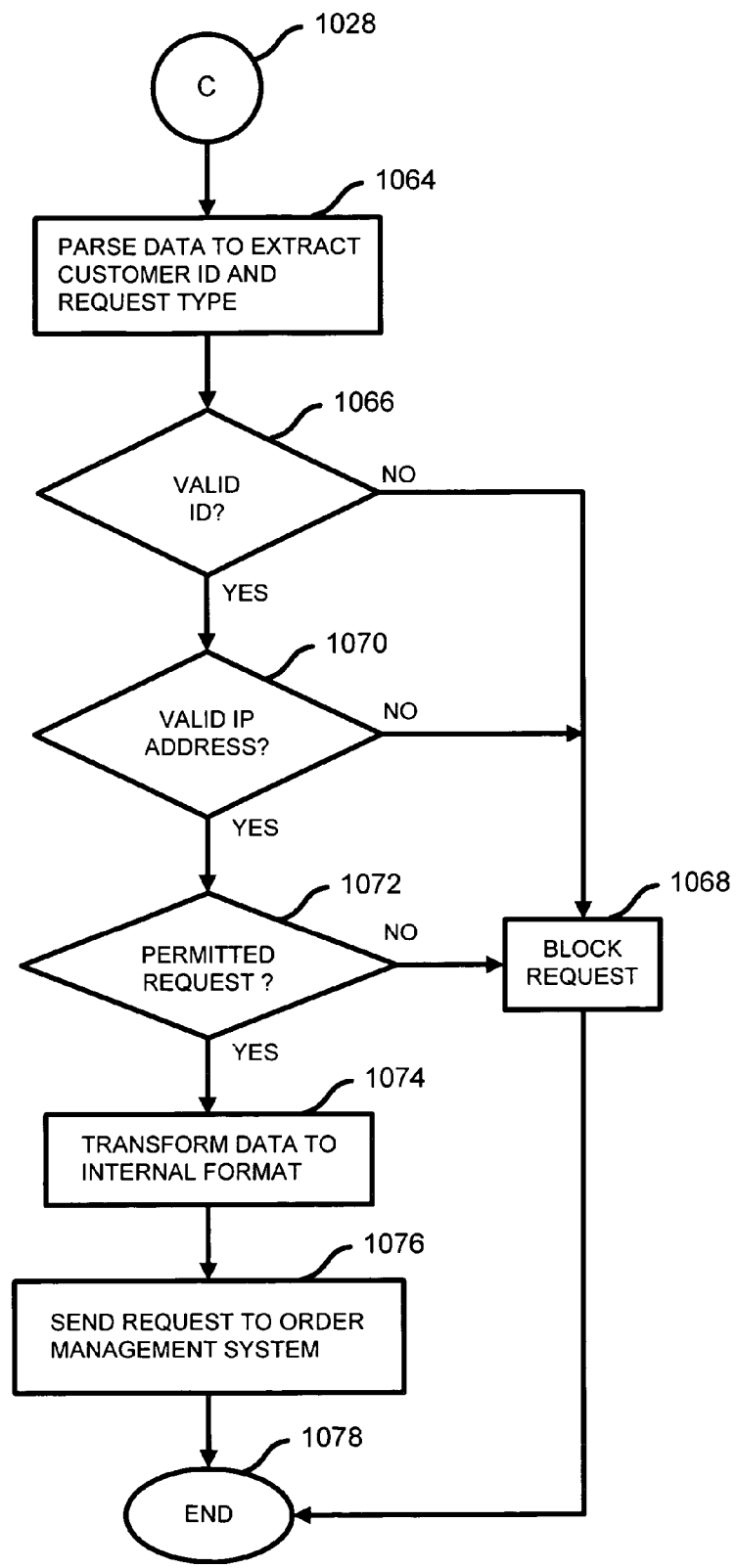
Figure 10E:
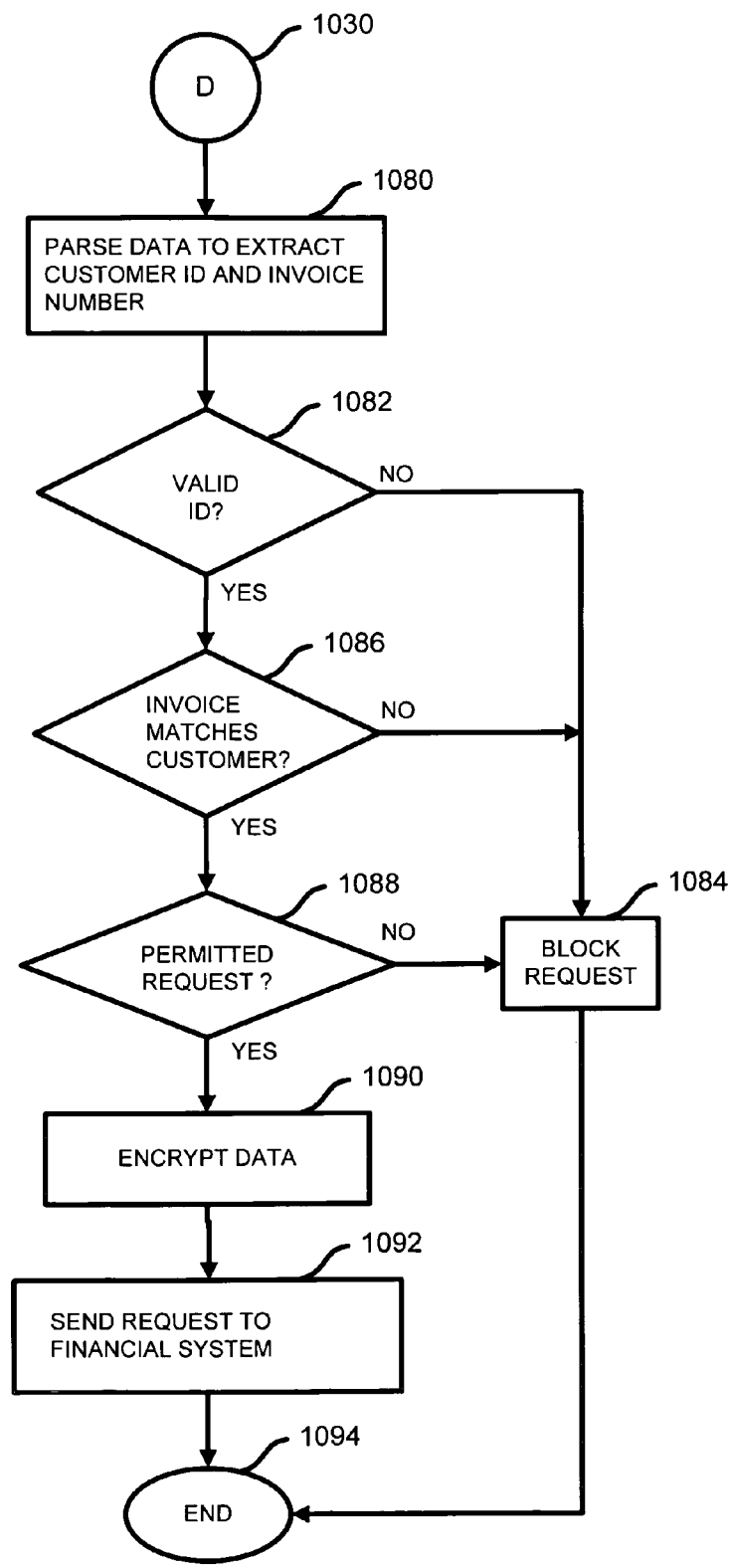

FIG. 10E shows the portion of the process in which the decision tree for sales representative-originated requests to the CRM system is applied. The process starts at step 1018 and proceeds to step 1032 in which the request data is parsed to extract a user identification and a request type. In one embodiment, user identification may be the name of the sales representative who sent the request. In one embodiment, the user identification may be a special user name and/or a password provided to the sales representative. In one embodiment, the user identification may be the source IP address and port number used to send the request. In step 1034, it is determined whether the user identification extracted in step 1032 corresponds to an authorized external user. If it is determined in step 1034 that the user identification does not correspond to an authorized external user, the process proceeds to step 1036 in which the request is blocked, as described above. If the request is blocked in step 1036, the portion of the process shown in FIG. 10B ends in step 1046. If it is determined in step 1034 that the user identification does correspond to an authorized external user of the CRM system, the process proceeds to step 1038 in which event it is determined whether the request type extracted in step 1032 corresponds to a type of request that sales representatives are permitted to make. For example, as described above, sales representatives may be limited to accessing information only with respect to those customers for which it acts as a sales representative for the company. If it is determined in step 1038 that the request type does not correspond to a type of request that an external sales representative is permitted to make, the process proceeds to step 1036, in which the request is blocked, and the process ends in step 1046. If it is determined in step 1038 that the request is a permitted request, the process proceeds to step 1040 in which event the data portion of the request is transformed into an internal format usable and recognizable by the CRM system. In one embodiment, the format of the incoming request is XML and extensible style sheet language (XSL) code is used to transform the XML into HTML for use by the internal customer relationship management system. In one embodiment, the format of the incoming request is in accordance with the Simple Object Access Protocol (SOAP). SOAP is an XML-based protocol and may be an appropriate protocol to use for the sending of requests described herein wherever XML or another markup language is described as being used.

In step 1042, the transformed data is encrypted using the encryption method specified in the policy database for request messages sent by the mediating firewall to the internal CRM system. In step 1044, a request message from the mediating firewall to the internal CRM system is prepared and sent to the CRM system. In one embodiment, the protocol used to send the request from the mediating firewall to the internal CRM system is specified in the policy database as described above. In one embodiment, authentication and/or integrity checking procedures may be performed with respect to the message sent from the mediating firewall to the internal CRM system, as described above. Once the mediating firewall has sent the request to the CRM system, the process shown in FIG. 10B ends in step 1046.

The portion of the process shown in FIG. 10C implements the decision tree process for sales representative-originated requests to the internal order management system. The process starts at step 1020 and proceeds to step 1048 in which event the request data is parsed to extract a user identification, a customer identification, and a request type data. In one embodiment, the user identification and request type may be the same as or similar to the information described above in connection with step 1032 of the portion of the process shown in FIG. 10B. In one embodiment, the customer identification may be a customer name field. In one embodiment the customer identification may be a customer number field.

Once the data have been extracted in step 1048, it is determined in step 1050 whether the request was originated by an authorized user of the order management system. In one embodiment, the determination made in step 1050 is the same as or similar to the determination made in step 1034 of the portion of the process shown in FIG. 10B. If it is determined in step 1050 that the originator of the request is not an authorized user of the order management system, the process proceeds to step 1052 in which event the request is blocked, as described above, and the process ends in step 1062. If it is determined in step 1050 that the originator of the request is an authorized user of the order management system, the process proceeds to step 1054 in which event it is determined whether the customer identification extracted in step 1048 corresponds to a customer associated with the authorized user. In one embodiment, the authorized sales representative user is only permitted to access on the order management system information associated with customers with respect to which the sales representative serves as the representative of the company. If it is determined in step 1054 that the customer identification extracted in step 1048 does not correspond to a customer associated with the authorized user, the process proceeds to step 1052, in which event the request is blocked, and ends in step 1062. If it is determined in step 1054 that the customer identification extracted in step 1048 does correspond to a customer associated with the authorized user, the process proceeds to step 1056 in which event it is determined whether the request type corresponds to a permitted request type. In one embodiment, as described above, a sales representative may be limited to accessing information about the status of orders placed by the sales representative and may be permitted to place new orders on behalf of customers associated with the sales representative. If it is determined in step 1056 that the request type does not correspond to a permitted request type, the process proceeds to step 1052 in which the request is blocked and ends in step 1062. If it is determined in step 1056 that the request type corresponds to a permitted request type, the process proceeds to step 1058 in which the data of the request is transformed into the internal format used by the mediating firewall to send requests to the internal order management system. In step 1060, the mediating firewall prepares and sends to the order management system a request for the data necessary to respond to the requesting party. In the portion of the process shown in FIG. 10C, no encryption step is included, for example because the system administrator has confidence that other security measures, such as control or physical access to the internal network or the like are sufficient to provide security for internal requests to the order management system sent by the mediating firewall to the order management system via the Internal network. In other implementations and embodiments, encryption and other security measures may be used for such a request.

The portion of the process shown in FIG. 10D implements a decision tree for a customer-originated request to the order management system. The process starts at step 1028 and proceeds to step 1064 in which the request data is parsed to extract a customer identification and a request type. In one embodiment, the customer identification and request type may be the same as or similar to the corresponding information described above in connection with step 1032 or the portion of the process shown in FIG. 10B and step 1048 of the portion of the process shown in FIG. 10C. In step 1066, it is determined whether the customer identification extracted in step 1064 corresponds to an authorized customer user of the order management system. If it is determined in step 1066 that the customer identification does not correspond to an authorized customer user of the order management system, the process proceeds to step 1068 in which the request is blocked, as described above. If the request is blocked in step 1068, the process proceeds to step 1078 in which the process ends. If it is determined in step 1066 that the customer identification extracted in step 1064 corresponds to an authorized customer user of the order management system, the process proceeds to step 1070 in which it is determined whether the source IP address of the request corresponds to a valid source IP address for external customer access to the order management system. In one embodiment, for purposes of security and control, the customer may be limited to using a particular computer system having a particular IP address to send requests to the internal order management system. If it is determined in step 1070 that the source IP address of the request does not correspond to a valid IP address for sending customer-originated requests to the internal order management system, the process proceeds to step 1068 in which the request is blocked, and ends in step 1078. If it is determined in step 1070 that the source IP address does correspond to a valid IP address for sending customer-originated requests to the internal order management system, the process proceeds to step 1072 in which it is determined whether the request type data extracted in step 1064 corresponds to a permitted request type for a customer-originated order management system. In one embodiment, as described above, customers are limited to checking the status of their own orders on the internal order management system. If it is determined in step 1072 that the request type does not correspond to a permitted request type, the process continues to step 1068, in which the request is blocked, and ends in step 1078. If it is determined in step 1072 that the request type does correspond to a permitted request type, the process proceeds to step 1074 in which the data is transformed into the internal data format used for requests from the mediating firewall to the internal order management system. In step 1076, the mediating firewall prepares and sends a request to the order management system to obtain the data needed to enable the mediating firewall to respond to the customer-originated request. The process then ends in step 1078.

Finally, the portion of the process shown in FIG. 10E implements the decision tree process for customer-originated requests to the financial system. The process starts in step 1030 and proceeds to step 1080 in which requested data is parsed to extract a customer identification and invoice number data. In one embodiment, the customer identification data extracted in step 1080 may be the same as or similar to the customer and/or user identification data described above in connection with step 1032 of the process shown in FIG. 10B, step 1048 of the process shown in FIG. 10C, and/or step 1064 of the process shown in FIG. 10D. In step 1082, it is determined whether the customer identification extracted in step 1080 corresponds to a valid customer identification for a customer-originated request to the internal financial system. If it is determined in step 1082 that the customer identification does not correspond to a valid identification for a request to the financial system, the process proceeds to step 1084, in which the request is blocked as described above and ends in step 1094. If it is determined in step 1082 that the customer identification extracted in step 1080 does correspond to a valid identification for a customer-originated request to the internal financial system, the process proceeds to step 1086 in which it is determined whether the invoice number data extracted in step 1080 corresponds to an invoice associated with the customer who sent the request. If it is determined in step 1086 that the invoice number does not correspond to the customer who sent the request, the process proceeds to step 1084, in which the request is blocked and ends in step 1094. If it is determined in step 1086 that the invoice number does correspond to the customer who sent the request, the process proceeds to step 1088, in which it is determined whether the request is of a type that a customer is permitted to make. For example, in one embodiment, as described above, the customer may be limited to checking the status of the customer's own invoices and determining the remaining credit available to it based on its credit limit and outstanding invoice amounts. In one embodiment, the format of the data portion of the request is checked to determine the type of request being made and whether the request is of a type that a customer is permitted to make. If it is determined in step 1088 that the request is not a permitted request, the process proceeds to step 1084 in which the request is blocked, and ends in step 1094. If it is determined in step 1088 that the request is a permitted request, the process proceeds to step 1090, in which the data portion of the message to be sent by the mediating firewall to the internal financial system is encrypted using the method specified in the policy database. In this case, it is assumed that no transformation of the data is required, such as because the external user has been instructed to make the request in the format required for the internal system. In step 1092, the mediating firewall prepares and sends to the internal financial system for the data needed by the mediating firewall to send a responsive message to the requesting party. The process then ends in step 1094.

Figure 11:
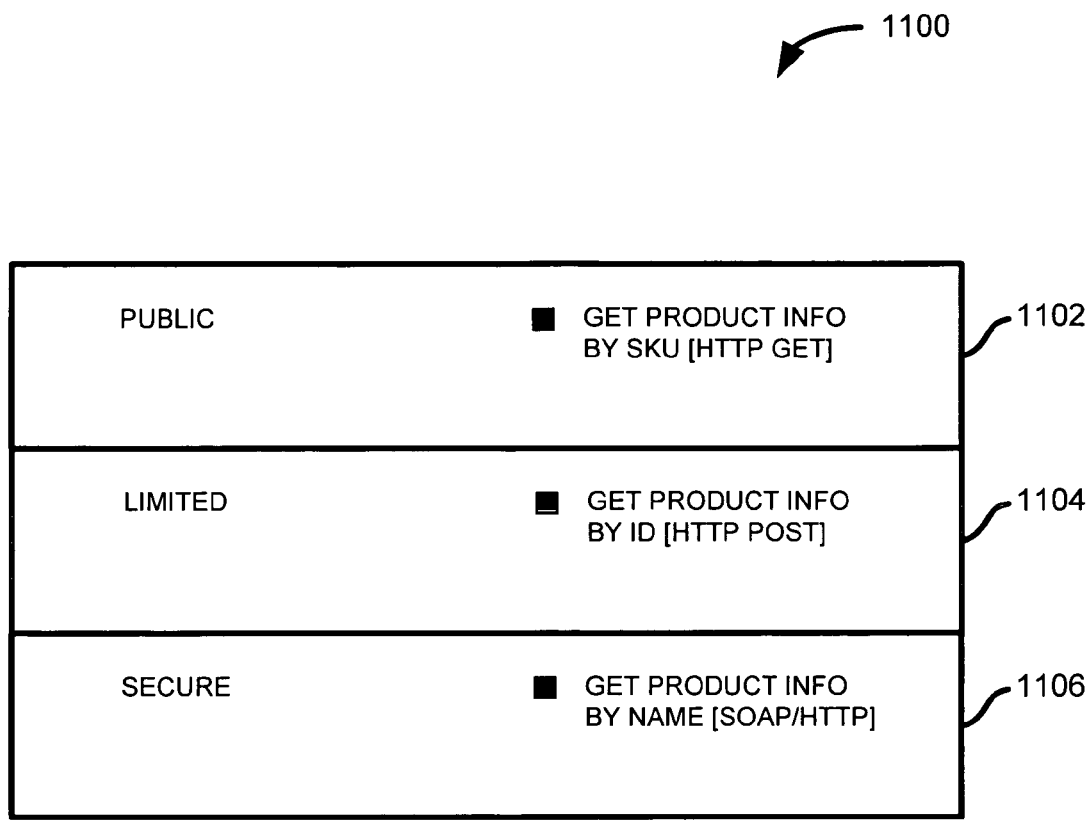
FIG. 11 shows an exemplary security summary display used in one embodiment to enable a user to view in one place a summary of security status information concerning all of the resources associated with a particular mediating firewall system or group of systems.

FIG. 11 shows an exemplary security summary display 1100 used in one embodiment to enable a user to view in one place a summary of security status information concerning all of the resources associated with a particular mediating firewall system or group of systems. The display 1100 comprises a "public" level of security information display area 1102, in which information may be displayed concerning those services associated with the mediating firewall that are accessible by the public without imposing any restriction on access. In the example shown in FIG. 11, the service named "get product information by SKU" is available to the public without restriction if accessed by means of an HTTP GET request. The display 1100 further comprises a "limited" level of security display area 1104, in which information may be displayed concerning those services associated with the mediating firewall that are accessible only to a limited group of users. In one embodiment, to access a "limited" service the requesting party must request access from a client that falls within a prescribed list or range of IP addresses. In the example shown in FIG. 11, "limited" access is provided to the service named "get product information by ID", with requests being made via an HTTP POST request. The display 1100 further comprises a "secure" level of security display area 1106, in which information may be displayed concerning those services associated with the mediating firewall that have a "secure" level of security. In one embodiment, a "secure" service may only be accessed by providing a certificate or other credential verifying the identity of the requesting party and confirming that the requesting party is authorized to access the secure service. In the example shown in FIG. 11, the service named "get product information by name" is listed as a secure service, which may be accessed by authorized users via SOAP and/or HTTP requests.

In one embodiment, the display 1100 of FIG. 11 may use color coding to enable a user to more readily identify and distinguish public, limited, and secure services. For example, in one embodiment the word "public" may be displayed in red, the word "limited" in yellow, and the word "secure" in green. While only one exemplary service is shown in each respective information display area of display 1100, each information display area may display information associated with as many services to which the corresponding level of security may be applicable. Also, while three levels of security are shown for purposes of illustration in FIG. 11, more or fewer different levels of security may be provided in particular embodiments and implementations, depending on the requirements of a particular application. In one embodiment, the display 1100 comprises a key explaining the security measures associated with each level of security listed in the display 1100, such as "public", "limited", and "secure" as shown in FIG. 11.

Although the foregoing invention has been described in some detail for purposes of clarity of understanding, it will be apparent that certain changes and modifications may be practiced within the scope of the appended claims. It should be noted that there are many alternative ways of implementing the process, apparatus, and system of the present invention. Accordingly, the present embodiments are to be considered as illustrative and not restrictive, and the invention is not to be limited to the details given herein, but may be modified within the scope and equivalents of the appended claims.

What is claimed is:

1. A method of sending a request, comprising:
   receiving via an external network an external request sent using a first security procedure, wherein the external request comprises a request from a requesting party for response data associated with an internal computer system associated with an internal network;
   normalizing at least a portion of the external request into a common format;
   applying a decision tree to the normalized external request to determine an action to take in response to the external request; and
   sending to the internal computer system, after applying the decision tree to the normalized external request and using a second security procedure based at least in part on the results of the application of the decision tree, an internal request for said response data.

2. A method as recited in claim 1, wherein at least one of the first security procedure and the second security procedure is associated with Extensible Markup Language (XML).

3. A method as recited in claim 1, wherein using the first security procedure to send the external request allows a recipient of the external request to determine whether the external request is authorized.

4. A method as recited in claim 1, wherein the first security procedure and second security procedure are associated with different credentials.

5. A method as recited in claim 1, wherein the first security procedure and second security procedure comprise different authentication methods.

6. A method as recited in claim 1, wherein the first security procedure and second security procedure comprise different techniques to verify the integrity of a network communication.

7. A method as recited in claim 1, wherein the first security procedure and second security procedure comprise different encryption methods.

8. A method as recited in claim 1, wherein the first security procedure and second security procedure are associated with different security policy rules.

9. A method as recited in claim 1, wherein the first security procedure and second security procedure are associated with different protocols.

10. A method as recited in claim 1, further comprising analyzing at least a portion of the content of the external request to determine that the external request is authorized and sending the internal request based at least in part on the determination that the external request is authorized.

11. A method as recited in claim 1, further comprising storing, for use when sending the response data to the sender of the external request, information associated with the first security procedure.

12. A method as recited in claim 1, wherein the internal request is generated at a mediating firewall that received the external request.

13. A method as recited in claim 1, wherein the second security procedure is at least in part determined using one or more policy rules.

14. A system for sending a request, comprising:
   an external network interface configured to receive an external request sent using a first security procedure and to normalize at least a portion of the external request into a common format, wherein the external request comprises a request from a requesting party for response data associated with an internal computer system associated with an internal network; and
   one or more processors coupled to the external network interface and configured to apply a decision tree to the normalized external request to determine an action to take in response to the external request, the process being further configured to send to the internal computer system, after applying the decision tree to the normalized external request and using a second security procedure based at least in part on the results of the application of the decision tree, an internal request for said response data.

15. A system as recited in claim 14, wherein at least one of the first security procedure and the second security procedure is associated with Extensible Markup Language (XML).

16. A system as recited in claim 14, wherein the first security procedure and second security procedure are associated with different credentials.

17. A system as recited in claim 14, wherein the processor is further configured to analyze at least a portion of the content of the external request to determine that the external request is authorized and to send the internal request to the internal computer system based at least in part on the determination that the external request is authorized.

18. A computer program product for sending a request, the computer program product being embodied in a computer readable storage medium and comprising computer instructions for:

receiving via an external network an external request sent using a first security procedure, wherein the external request comprises a request from a requesting party for response data associated with an internal computer system associated with an internal network;

normalizing at least a portion of the external request into a common format;

applying a decision tree to the normalized external request to determine an action to take in response to the external request; and sending to the internal computer system, after applying the decision tree to the normalized external request and using a second security procedure based at least in part on the results of the application of the decision tree, an internal request for said response data.

19. A computer program product as recited in claim 18, wherein at least one of the first security procedure and the second security procedure is associated with Extensible Markup Language (XML).

* * * * *